US011978377B2

(12) United States Patent
He et al.

(10) Patent No.: US 11,978,377 B2
(45) Date of Patent: May 7, 2024

(54) DRIVING CIRCUIT AND DRIVING DEVICE FOR DISPLAY PANEL

(71) Applicant: HKC CORPORATION LIMITED, Shenzhen (CN)

(72) Inventors: Jing He, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/002,341

(22) PCT Filed: Dec. 30, 2021

(86) PCT No.: PCT/CN2021/143430
§ 371 (c)(1),
(2) Date: Dec. 19, 2022

(87) PCT Pub. No.: WO2023/019866
PCT Pub. Date: Feb. 23, 2023

(65) Prior Publication Data

US 2024/0119879 A1 Apr. 11, 2024

(30) Foreign Application Priority Data

Aug. 16, 2021 (CN) ......................... 202110935013.8

(51) Int. Cl.
*G09G 3/20* (2006.01)

(52) U.S. Cl.
CPC ........... *G09G 3/20* (2013.01); *G09G 2310/08* (2013.01); *G09G 2320/02* (2013.01)

(58) Field of Classification Search
CPC ... G09G 3/20; G09G 2310/08; G09G 2320/02
See application file for complete search history.

(56) References Cited

U.S. PATENT DOCUMENTS

2016/0131954 A1 5/2016 Li et al.
2017/0345387 A1 11/2017 Kim et al.
2018/0190223 A1 7/2018 Zeng
2019/0164465 A1* 5/2019 Hu ......................... G11C 19/28
(Continued)

FOREIGN PATENT DOCUMENTS

CN 101303895 A 11/2008
CN 102723064 A 10/2012
(Continued)

*Primary Examiner* — Sejoon Ahn
(74) *Attorney, Agent, or Firm* — Maier & Maier, PLLC

(57) ABSTRACT

A driving circuit and a driving device for a display panel, and the driving circuit for the display panel includes: a stretching circuit, a control circuit, a bootstrapping circuit, and an output circuit; the control circuit is respectively electrically connected with the stretching circuit, the bootstrapping circuit, and the output circuit, and the bootstrapping circuit is electrically connected with the output circuit. The stretching signal generated by the stretching circuit can enable the bootstrapping circuit to have enough time to be charged, and ensure that the output circuit can reach or exceed the preset potential when receiving the bootstrap signal, thereby the voltage being not stable when the gate driving signal is output is avoided, and the phenomenon that the gate driving signal is stopped in advance is avoided.

15 Claims, 18 Drawing Sheets

(56) References Cited

U.S. PATENT DOCUMENTS

| | | | | |
|---|---|---|---|---|
| 2019/0164509 | A1* | 5/2019 | Yoshida | G09G 3/36 |
| 2019/0164512 | A1* | 5/2019 | Saitoh | G09G 3/20 |
| 2019/0164516 | A1* | 5/2019 | Takahashi | G09G 3/3677 |
| 2020/0082788 | A1* | 3/2020 | Qiu | G09G 5/10 |
| 2020/0082791 | A1* | 3/2020 | Petrie | G09G 3/20 |
| 2020/0084309 | A1* | 3/2020 | Jin | H04W 52/0254 |

FOREIGN PATENT DOCUMENTS

| | | | |
|---|---|---|---|
| CN | 104916265 | A | 9/2015 |
| CN | 105427830 | A | 3/2016 |
| CN | 107845403 | A | 3/2018 |
| CN | 111508448 | A | 8/2020 |
| CN | 112908235 | A | 6/2021 |
| CN | 113380178 | A | 9/2021 |
| JP | 2018508032 | A | 3/2018 |

* cited by examiner

DRIVING CIRCUIT AND DRIVING DEVICE FOR DISPLAY PANEL

CROSS REFERENCE TO RELATED APPLICATION

This application is a National Stage Appl. of International Patent Application No. PCT/CN2021/143430 with an international filing date of Dec. 30, 2021 designating the United States, now pending, and further claims foreign priority benefits to Chinese Patent Application No. 202110935013.8 filed Aug. 16, 2021. The contents of all of the aforementioned applications, including any intervening amendments thereto, are incorporated herein by reference.

TECHNICAL FIELD

The present application relates to the field of display technology, and more particularly to a driving circuit and a driving device for a display panel.

BACKGROUND

The descriptions herein merely provide background information related to the present application and do not necessarily constitute prior art. With the continuous development of display technology, display panels are widely used in various fields such as entertainment, education, and security. Gate Driver Less (GDL) technology refers to a driving method in which a gate driver IC is directly fabricated on an array substrate to realize progressive scanning of the gate electrode. The GDL technology can simplify the manufacturing process of the display panel, save the chip bonding process in the horizontal scanning line direction, and reduce the production cost.

At present, users have higher and higher requirements for the refresh rate and resolution of the display panel, and it is necessary to increase the frequency of gate scanning, so that the frequency of the gate driver outputting the gate driving signal should also increase, which results in the charging time of the gate driver is reduced each time the gate driving signal is output, and the gate driving signal is prone to voltage instability during the output process, which affects the display effect.

SUMMARY

One of objects of embodiments of the present application is to provide a driving circuit and a driving device for a display panel, which aims to solve the technical problem that the gate driving signal of the GDL technology in the art is prone to voltage instability during the output process, and the display effect is affected.

The technical solution adopted in embodiments of the present application is:

In a first aspect, a driving circuit is provided, which includes: a stretching circuit, an output circuit, a bootstrapping circuit, and a control circuit; the bootstrapping circuit is electrically connected with the output circuit; and the control circuit is electrically connected with the stretching circuit, the bootstrapping circuit, and the control circuit, respectively;

the stretching circuit is configured to receive a first level signal, and to generate a stretching signal according to the first level signal when a first transmitting signal is received, and to send the stretching signal to the control circuit; wherein the first transmitting signal comprises at least two sub-transmitting signals with different timings, and a time duration of the stretching signal is determined according to a time duration of the first transmitting signal;

the control circuit is configured to receive the first level signal, to generate a control signal according to the first level signal when the stretching signal is received, and to send the control signal to the output circuit and the bootstrapping circuit;

the bootstrapping circuit is configured to receive the control signal, and to send a bootstrap signal to the output circuit when the control signal is switched to a low level; and the output circuit is configured to receive a clock signal, and to generate a gate driving signal and a second transmitting signal according to the clock signal when the bootstrap signal is received, and to send the gate driving signal to sub-pixels of a display panel and send the second transmitting signal.

In a second aspect, a driving device is provided, which includes: 2a clock signal generators and n driving circuits in the first aspect;

a j-th clock signal generator is connected to an output circuit of a j+2ka-th driving circuit, a first stretching unit of a i+2a-th driving circuit is connected to a second outputting unit of the i-th driving circuit, and a second outputting unit of the i+2a-th driving circuit is connected to a second outputting unit of a i-th driving circuit, and a second stretching unit of a i+2a-th driving circuit is connected to a second outputting unit of a i+a-th driving circuit;

the j-th clock signal generator is configured to generate a clock signal and send the clock signal to the output circuit of the j+2ka-th driving circuit, and a phase difference between a clock signal generated by the j-th clock signal generator and a clock signal generated by the j+1-th clock signal generator is $\pi/2a$;

the first stretching unit of the i+2a-th driving circuit is configured to send a first sub-stretching signal to the control circuit when the first sub-transmitting signal sent by the second outputting unit of the i-th driving circuit is received;

the second stretching unit of the i+2a-th driving circuit is configured to send a second sub-stretching signal to the control circuit when the second sub-transmitting signal sent by the second outputting unit of the i+a-th driving circuit is received;

the second outputting unit of the i+2a-th driving circuit is configured to receive the first sub-transmitting signal sent by the second outputting unit of the i-th driving circuit, and to discharge the clock signal when the second outputting unit of the i+2a-th driving circuit receives the control signal and the clock signal; and wherein a is an integer greater than or equal to 1; n is an integer greater than 2a; i is greater than or equal to 1 and less than or equal to n−2a; j=1,2, . . . ,2a; k=0,1, 2, . . . ,(n/2a); and j+2ka is less than or equal to n.

In the driving circuit of the display panel provided by the embodiment of the present application, the stretching signal generated by the stretching circuit can enable the bootstrapping circuit to have enough time to be charged, and ensure that the output circuit can reach or exceed the preset potential when receiving the bootstrap signal, thereby the voltage being not stable when the gate driving signal is output is avoided, and the phenomenon that the gate driving signal is stopped in advance is avoided, the stability of outputting the gate driving signal is improved, and the refresh rate and resolution of the display panel, as well as the display brightness and display stability of the display panel, are improved.

The driving device of the display panel provided by the embodiment of the present application, by cascading the driving circuit and cooperating with the driving device constituted by the clock signal generator, input signals that need to be used is less, and the structure is simple, so that the driving device can run stably and cyclically and continuously output multi-sequence gate driving signals, which has the advantages of strong anti-interference performance, low cost and stable output.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF THE EMBODIMENTS

Figure 1:
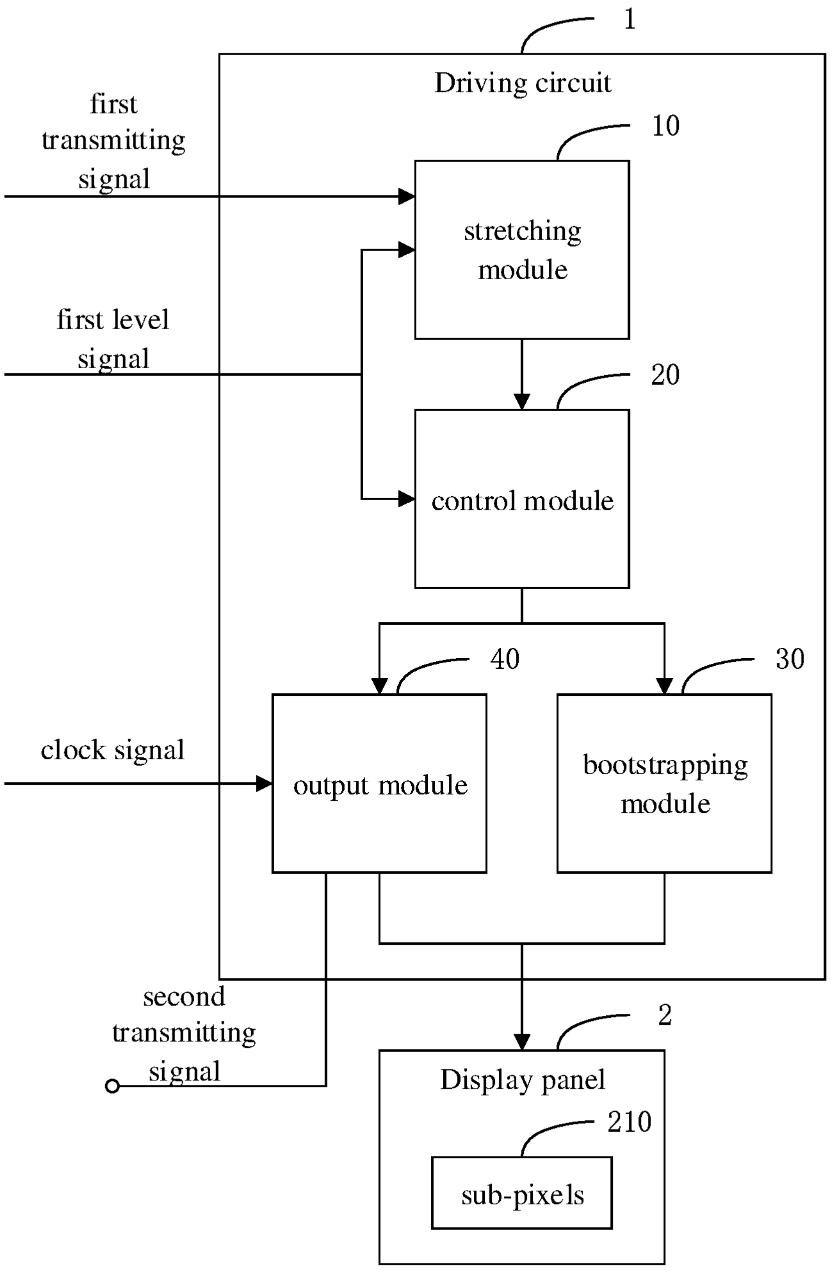
FIG. 1 is a first structural schematic diagram of a driving circuit of a display panel provided by an embodiment of the present application.

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It needs to be understood that, directions or location relationships indicated by terms such as “up”, “down”, “left”, “right”, and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn’t be considered as any limitation to the present application. In addition, terms "the first" and "the second" are only used in describe purposes, and should not be considered as indicating or implying any relative importance, or impliedly indicating the number of indicated technical features. In the description of the present application, "plurality" means two or more, unless there is additional explicit and specific limitation.

In order to illustrate the technical solutions provided in the present application, the following detailed description is given in conjunction with the specific drawings and embodiments.

In the application, the gate driver needs to be charged before outputting the gate driving signal, and the gate driver outputs the gate driving signal after charging, the longer the charging time of the gate driver, the better the stability of the gate driving signal. As the requirements of the user for display panel refresh rate and resolution are getting higher and higher, when the frequency of gate driver outputting gate driving signal is increased, the charging time of traditional gate driver each time outputting gate driving signal becomes shorter. As a result, the preset potential cannot be reached, and the gate driving signal is prone to voltage dips during the outputting process, resulting in a decrease in the stability of the outputting of the gate driving signal, which makes the display brightness of the display panel unstable.

An embodiment of the present application provides a driving circuit for a display panel, which can be applied to the display panel. The stretching signal generated by the stretching circuit can make the bootstrapping circuit have enough time to charge, so that to ensure that the output circuit reaches the preset potential before outputting the gate driving signal. In this way, the voltage instability when outputting the gate driving signal and the phenomenon that the outputting of the gate driving signal is stopped in advance is avoided, so as to improve the stability of the outputting of the gate driving signal, thereby improving the refresh rate and resolution of the display panel while improving the display brightness of the display panel and the stability of the display effect.

In application, the display panel may be a liquid crystal display panel based on thin film transistor liquid crystal display (TFT-LCD) technology, a liquid crystal display panel based on liquid crystal display (LCD technology, based on an organic electric laser display panel based on Organic Light-Emitting Diode (OLED) technology, a quantum dot light-emitting diode display panel based on Quantum Dot Light Emitting Diodes (QLED) technology, or curved display panel, and so on.

Embodiment 1

As shown in FIG. 1, the driving circuit 1 provided in the first embodiment of the present application includes: a stretching circuit 10, a control circuit 20, a bootstrapping circuit 30, and an output circuit 40. The control circuit 20 is respectively electrically connected with the stretching circuit 10, the bootstrapping circuit 30 and the output circuit 40, and the bootstrapping circuit 30 is electrically connected to the output circuit 40;

the stretching circuit 10 is configured to receive a first level signal, and to generate a stretching signal according to the first level signal when a first transmitting signal is received, and to send the stretching signal to the control circuit 20; wherein the first transmitting signal comprises at least two sub-transmitting signals with different timings, and a time duration of the stretching signal is determined according to a time duration of the first transmitting signal;

the control circuit 20 is configured to receive the first level signal, to generate a control signal according to the first level signal when the stretching signal is received, and to send the control signal to the output circuit 40 and the bootstrapping circuit 30;

the bootstrapping circuit 30 is configured to receive the control signal, and to send a bootstrap signal to the output circuit 40 when the control signal is switched to a low level; and the output circuit 40 is configured to receive a clock signal, and to generate a gate driving signal and a second transmitting signal according to the clock signal when the bootstrap signal is received, and to send the gate driving signal to sub-pixels 210 of a display panel 2 and send the second transmitting signal.

In the applications, the driving circuit can include a plurality of transistors, comparators, logic gates, resistors, capacitors or inductors and other electronic components; the level signal and the clock signal can be generated through a timer control register (TCON) or a system on Chip (SOC) and input to the driving circuit; the level signal can be a high level signal or a low level signal, and the clock signal can be phase-shifted by TCON or SOC according to actual needs to obtain a plurality of clock signals with phase differences.

In the application, the first transmitting signal received by the stretching circuit can be the second transmitting signal output by an output circuit of another driving circuit of the display panel; the first level signal can be a high level signal of DC, and the stretching circuit can be turned on when the first transmitting signal is received to output the first level signal, and to turn off and stop to output the first level signal when the first transmitting signal is not received, so as to generate a stretching signal, by extending the time duration of the first transmitting signal, the time duration of the stretching signal can be extended. In an embodiment, the first transmitting signal can include at least two sub-transmitting signals with different timing sequences, and the time duration of the stretching signal is the same as the time duration of the first transmitting signal. By sending the stretching signal to the control circuit, the control circuit can be turned on and off.

In the application, the control circuit can turn on and output the first level signal when the stretching signal is received, and turn off and stop to output the first level signal when the stretching signal is not received, so as to generate the control signal and send the control signal to the output circuit and the bootstrapping circuit; the time duration of the control signal and the time duration of the stretching signal can be the same. In an embodiment, since the stretching unit can extend the time duration of the stretching signal, the control circuit can extend the on-time and realize the extension of the time duration of the control signal.

In the application, when the output circuit receives the control signal of the high level, the potential of the input port of the output circuit is pulled up to the first high potential, but the first high potential is smaller than the preset potential, which will cause the gate driving signal output by the output circuit is unstable.

In the application, the bootstrapping circuit can send the bootstrap signal to the output circuit when the control signal is switched from high level to low level; when the output circuit receives the bootstrap signal, the potential of the input port of the output circuit can be pulled up to a second high potential enables the input port of the output circuit to reach the preset potential or exceed the preset potential. It should be noted that due to the display characteristics of the display panel, the gate driving signal sent according to the frequency of the refresh rate can be used to control the deflection of the sub-pixels. Therefore, the output circuit can output a stable gate driving signal to the sub-pixels according to the frequency of the refresh rate to control the deflection of the sub-pixels. It is easy to understand that a certain time difference is existed between the unstable gate driving signal and the stable gate driving signal, so that the unstable gate driving signal will not be used to control the deflection of the sub-pixels; in addition, when the unstable gate driving signal is output before the stable gate driving signal, the unstable gate driving signal can be used to pre-charge the sub-pixels.

The preset potential is determined according to the voltage and time duration of the gate driving signal actually required by the display panel. If the input port of the output circuit can reach the preset potential by charging, a complete and stable gate driving signal can be generated. In addition, when the output circuit receives the bootstrap signal, the output circuit can further generate and send the second transmitting signal. The clock signal can be switched from low level to high level at the same moment when the control signal switches from high level to low level; the connection between the control circuit, the output circuit and the bootstrapping circuit is the input port of the output circuit.

In one embodiment, the bootstrapping circuit is configured to receive a control signal and to perform charging when the control signal is at a high level.

In the application, the bootstrapping circuit is charged to accumulate charges when the control signal is at a high level, and discharges the accumulated charges when the control signal is switched from a high level to a low level, thereby generating a bootstrap signal.

In the application, the output circuit can provide independent signals for different outputting objects. In an embodiment, when the outputting objects are sub-pixels of the display panel, the output circuit can provide a stable gate driving signal, and the stable gate driving signal can charge one or more rows of sub-pixels of the display panel to drive the display panel to display images, one display panel can include at least one driving circuit, and a number of the driving circuits is determined according to a number of clock signals used by the above-mentioned display panel; when the outputting object is another driving circuit of the display panel, the output circuit can provide a second transmitting signal, so as to provide the first transmitting signal for the stretching circuit of the above-mentioned other driving circuit. By providing independent signals for different outputting objects, interference between signals output to different outputting objects can be avoided, and the working stability of the display panel can be improved. The embodiment of the present application does not impose any restrictions on the type and quantity of outputting objects of the output circuit.

In the application, the stretching signal generated by the stretching circuit can make the bootstrapping circuit have enough time to charge, to ensure that the output circuit can reach or exceed the preset potential when the bootstrap signal is received, so that when the gate driving signal and the second transmitting signal are sent, the output circuit can be fully turned on and improve the signal transmitting efficiency, and avoiding the gate driving signal and the second transmitting signal from being stopped output due to the module being turned off in advance, so as to improve the stability of the outputting of the gate driving signal and the second transmitting signal.

Figure 2:
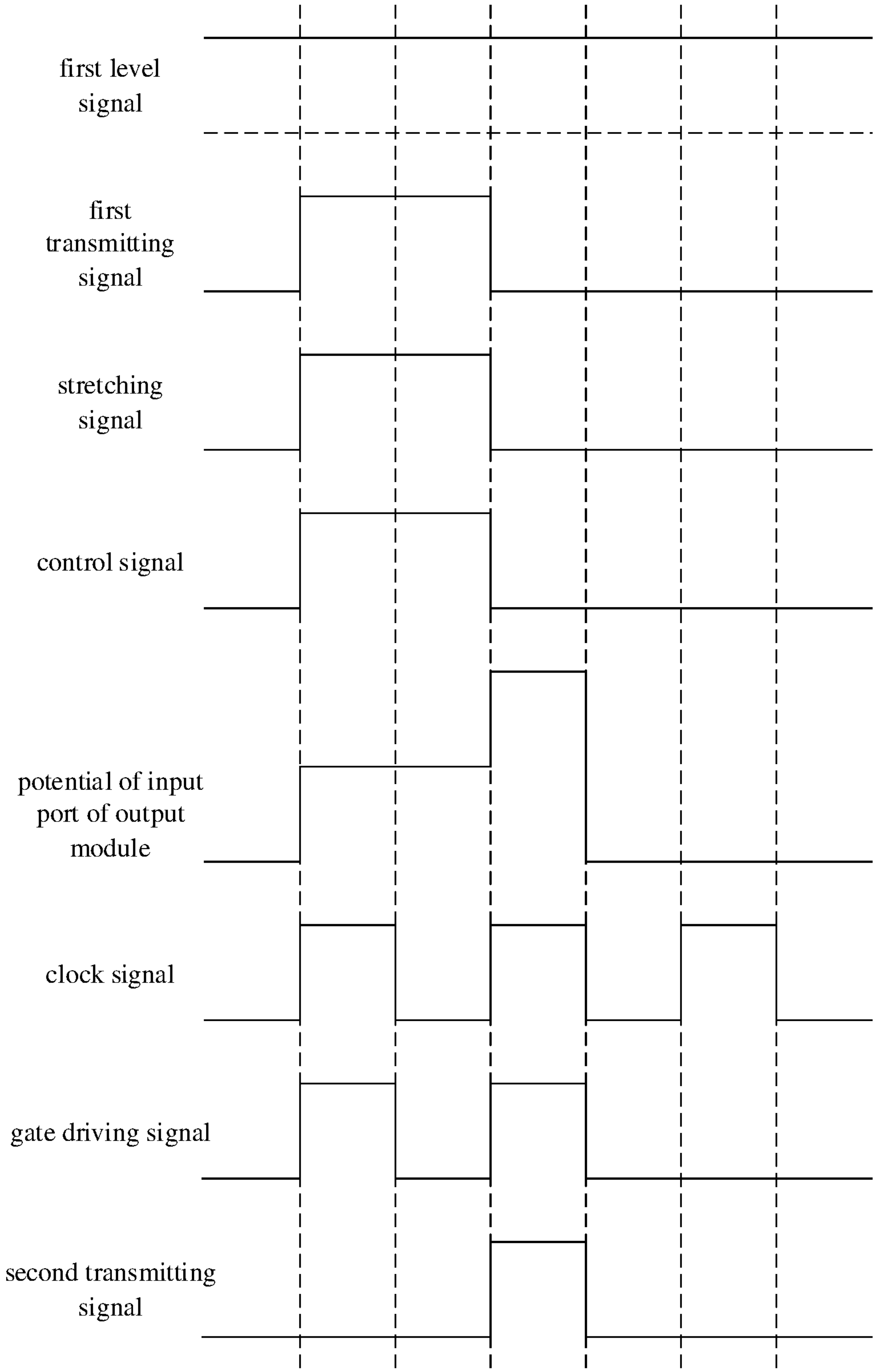
FIG. 2 is a schematic timing sequence diagram of a first level signal, a first transmitting signal, a stretching signal, a control signal, a potential of an input port of an output circuit, a clock signal, a gate driving signal, and a second transmitting signal provided by an embodiment of the present application.

FIG. 2 exemplarily shows a timing sequence diagram of a first level signal, a first transmitting signal, a stretching signal, a control signal, a potential of an input port of the output circuit, a clock signal, a gate driving signal, and a second transmitting signal.

Embodiment 2

Figure 3:
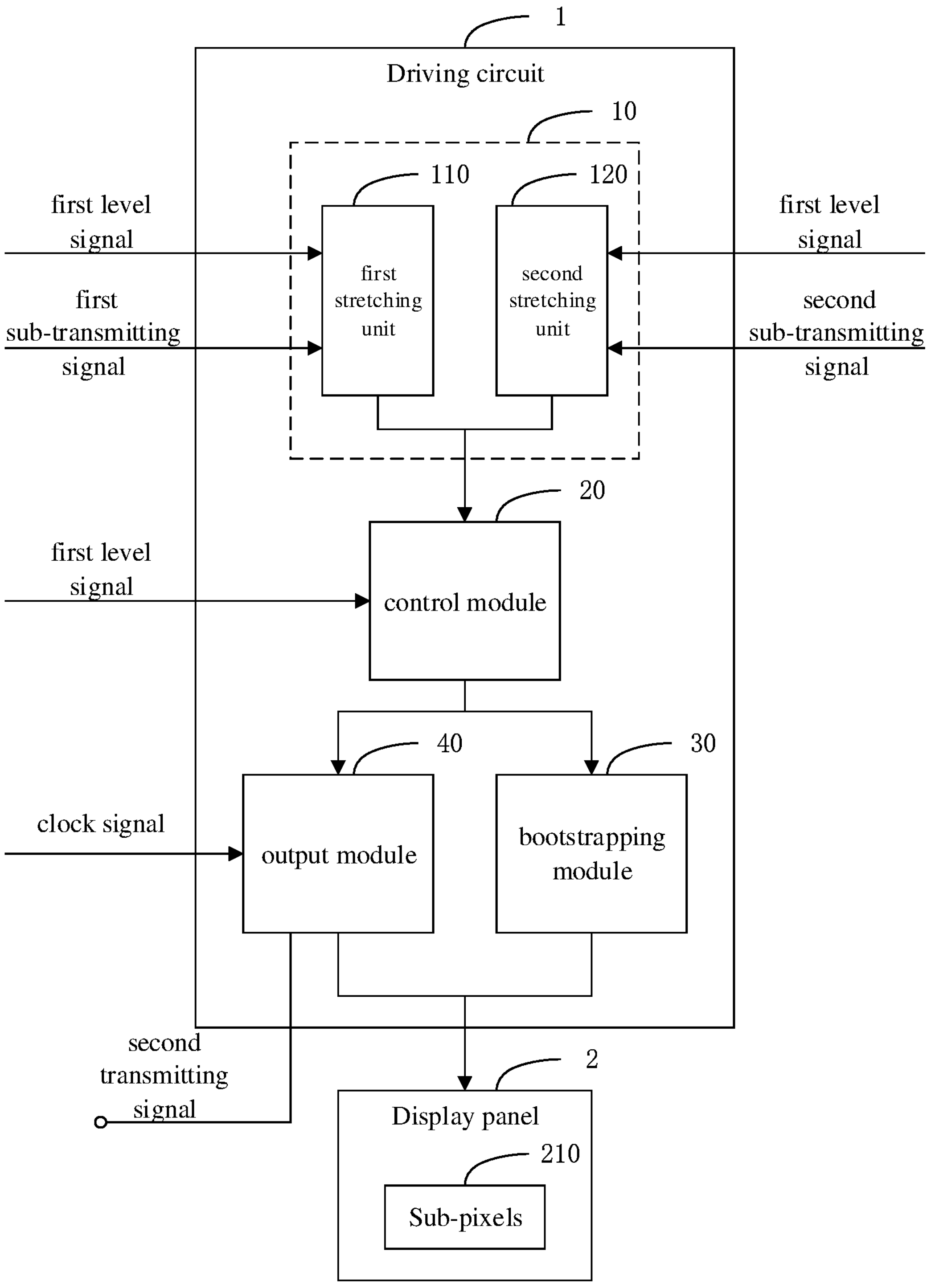
FIG. 3 is a second structural schematic diagram of a driving circuit of a display panel provided by an embodiment of the present application.

As shown in FIG. 3, based on the embodiment 1 corresponding to FIG. 1, the driving circuit 1 of the display panel provided in the second embodiment of the present application, the stretching circuit 10 includes: a first stretching unit 110 and a second stretching unit 120. The first stretching unit 110 and the second stretching unit 120 are respectively electrically connected to the control circuit 20;

the first stretching unit 110 is configured to receive the first level signal, and to generate the first sub-stretching signal according to the first level signal when the first sub-transmitting signal is received, and to send the first sub-stretching signal to the control circuit 20;

the second stretching unit 120 is configured to receive the first level signal, and to generate the second sub-stretching signal according to the first level signal when the second sub-transmitting signal is received, and to send the second sub-stretching signal to the control circuit 20; and the stretching signal includes the first sub-stretching signal and the second sub-stretching signal.

In the application, the stretching circuit can include at least two stretching units, and the working principle of each stretching unit is the same as the working principle of the stretching circuit provided in the foregoing embodiment, the difference is that each stretching unit is connected to the output circuits of different driving circuits to obtain the sub-transmitting signal, and each stretching unit can generate a sub-stretching signal according to the sub-transmitting signal. It should be noted that the time duration of each sub-stretching signal can be the same as the time duration of the corresponding sub-transmitting signal, due that the timing sequences of each sub-transmitting signal are different, and the stretching signal sent by the stretching circuit is composed of all sub-stretching signals. Therefore, the time duration of the stretching signal is determined according to the number and timing sequences of the sub-transmitting signals. By extending the time duration of the stretching signal, the time duration of the control signal output by the control circuit can be extended.

In an embodiment, the stretching circuit can include a first stretching unit and a second stretching unit. The first stretching unit and the second stretching unit are respectively connected to output circuits of different driving circuits. In order to distinguish different transmitting signals received by different stretching units, the transmitting signal received by the first stretching unit is defined as the first sub-transmitting signal, and the transmitting signal received by the second stretching unit is defined as the second sub-transmitting signal.

Figure 4:
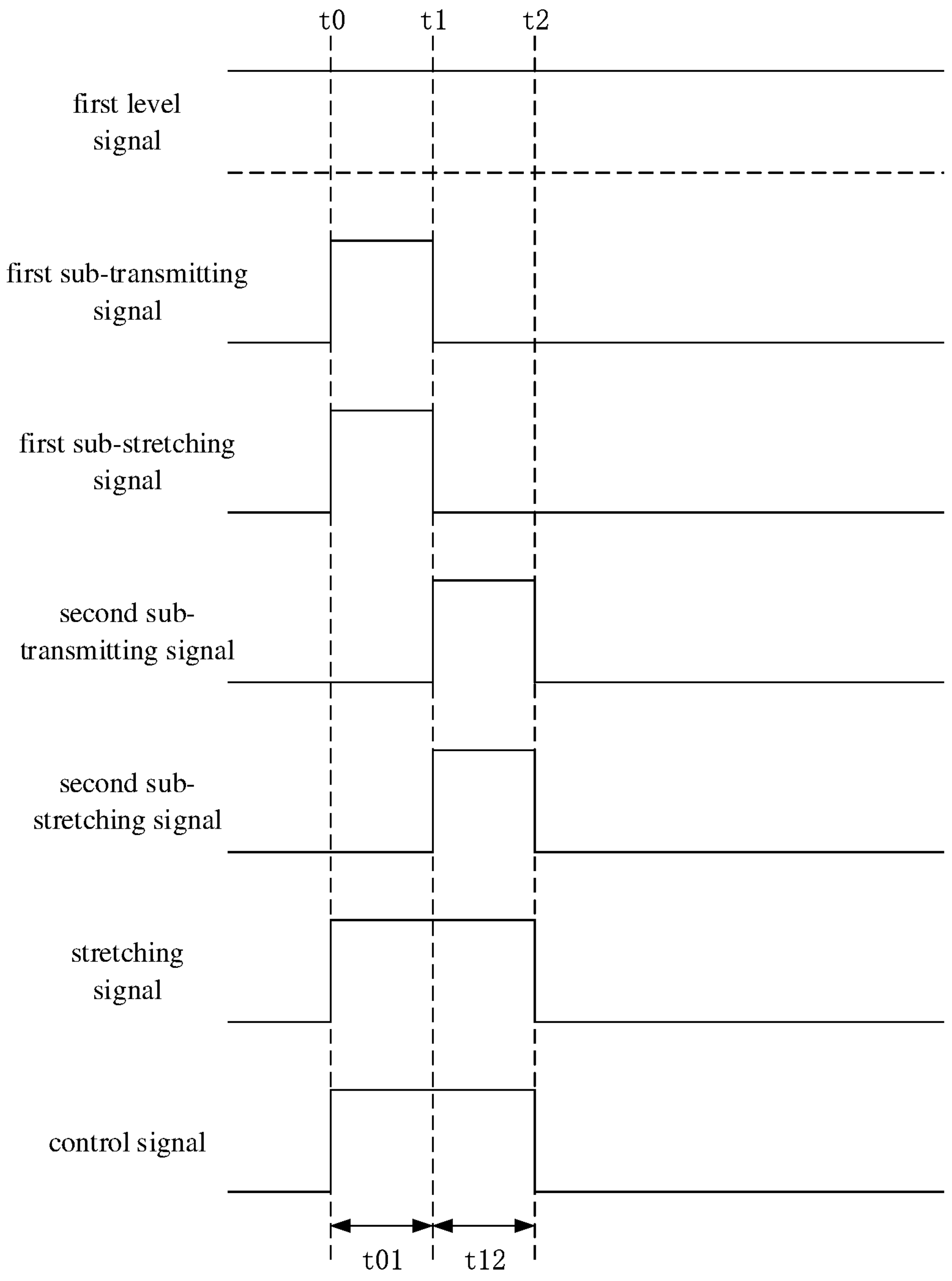
FIG. 4 is a schematic timing sequence diagram of a first level signal, a first sub-transmitting signal, a first sub-stretching signal, a second sub-transmitting signal, a second sub-stretching signal, a stretching signal, and a control signal provided by an embodiment of the present application.

FIG. 4 exemplarily shows the timing sequence diagram of a first level signal, a first sub-transmitting signal, a first sub-stretching signal, a second sub-transmitting signal, a second sub-stretching signal, a stretching signal, and a control signal, the working principles of the first stretching unit and the second stretching unit are described below with reference to FIG. 4:

The first stretching unit and the second stretching unit keep receiving the first level signal; the first stretching unit is turned on and output the first level signal at the time t0 when the first sub-transmitting signal is received, and the first stretching unit is turned off and stopped to output the first level signal at time t1 when the first sub-transmitting signal is not received, thereby generating a first sub-stretching signal of the high level in the first period of time t01; the second stretching unit is turned on and output the first level signal at the time t1 when the second sub-transmitting signal is received, and the second stretching unit is turned off and stopped to output the first level signal at time t2 when the first sub-transmitting signal is not received, thereby generating a first sub-stretching signal of the high level in the first period of time t12; the timing sequence of the first sub-transmitting signal and the timing sequence of the first sub-stretching signal are the same. Similarly, the timing sequence of the second sub-transmitting signal and the timing sequence of the second sub-stretching signal are also the same. By controlling the timing sequences of the first sub-transmitting signal and the second sub-transmitting signal can determine the timing sequence of the stretching signal. In an embodiment, the first sub-transmitting signal and the second sub-transmitting signal can be high level signals with the same voltage and a phase difference of 90 degrees, the stretching signal is composed of the sub-stretching signal and the second sub-stretching signal.

Embodiment 3

Figure 5:
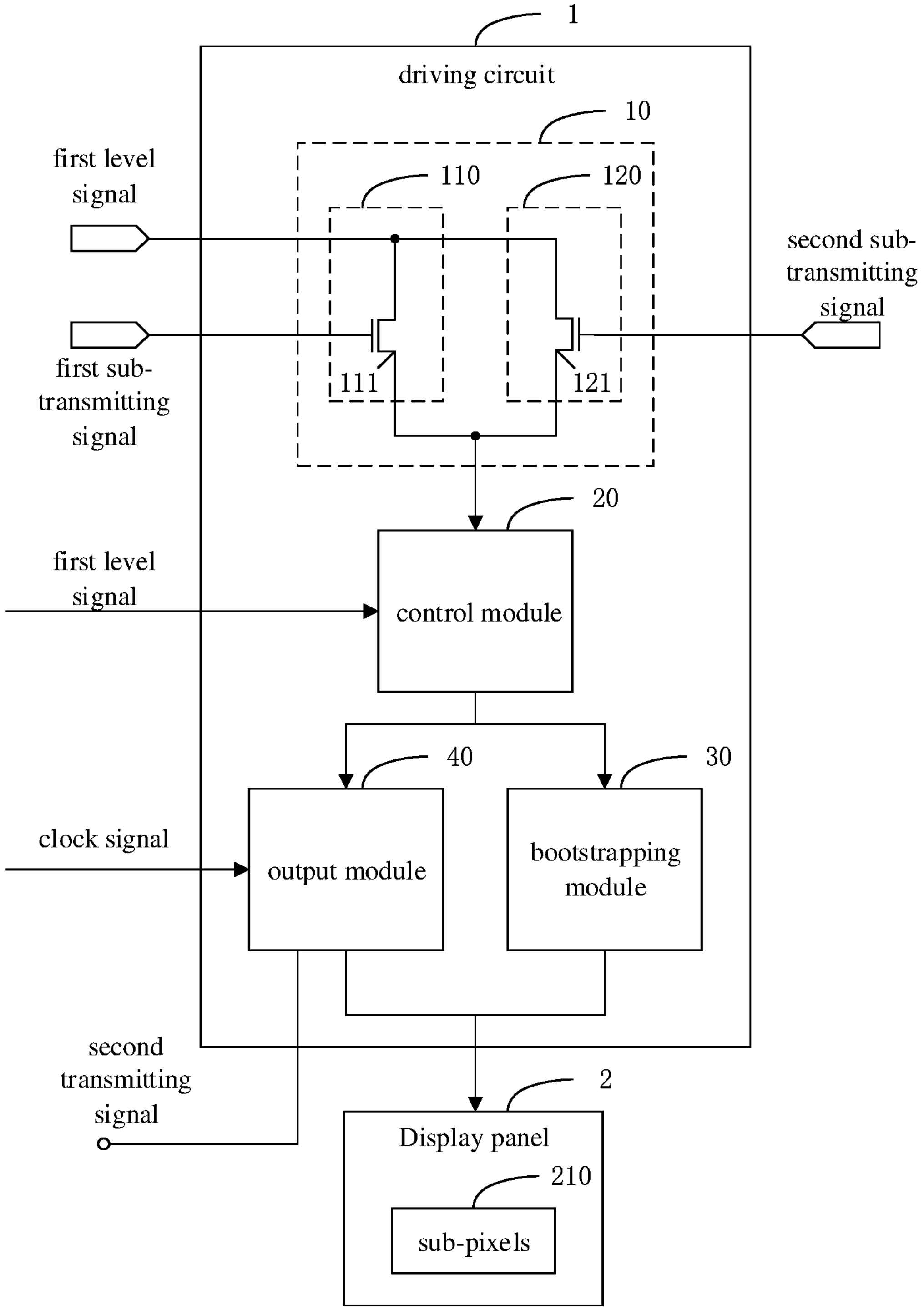
FIG. 5 is a third structural schematic diagram of a driving circuit of a display panel provided by an embodiment of the present application.

As shown in FIG. 5, based on the embodiment 2 corresponding to FIG. 3, in the driving circuit 1 of the display panel provided in the embodiment 3 of the present application, the first stretching unit 110 includes: a first electronic switch 111, and the second stretching unit 120 includes: a second electronic switch 121, the source electrode of the first electronic switch 111 is connected to the source electrode of the second electronic switch 121, and the drain electrode of the first electronic switch 111 is respectively electrically connected to the drain electrode of the second electronic switch 121 and the control circuit 20;

the source electrode of the first electronic switch 111 is configured to receive the first level signal, and when the gate electrode of the first electronic switch 111 receives the first sub-transmitting signal, the drain electrode of the first electronic switch 111 is configured to generate a first sub-stretching signal according to the first level signal, and to send the first sub-stretching signal to the control circuit 20; and the source electrode of the second electronic switch 121 is configured to receive the first level signal, and when the gate electrode of the second electronic switch 121 receives the second sub-transmitting signal, the drain electrode of the second electronic switch 121 is configured to generate a second sub-stretching signal according to the first level signal, and to send the second sub-stretching signal to the control circuit 20.

In the application, the first electronic switch and the second electronic switch can be any device or circuit with electronic switching function, for example, triode or metal oxide semiconductor field effect transistor (MOSFET), in an embodiment, which can be a thin film field transistor (TFT).

The working principles of the first electronic switch and the second electronic switch are described below with reference to the timing sequence diagram of FIG. 4 and the structural diagram of FIG. 5:

The source electrode of the first electronic switch and the source electrode of the second electronic switch are used to receive the first level signal; the gate electrode of the first electronic switch is turned on at the time t0 when the first sub-transmitting signal is received, so that the drain electrode of the first electronic switch outputs the first level signal, and the gate electrode of the first electronic switch is turned off at time t1 when the first sub-transmitting signal is not received, so that the drain electrode of the first electronic switch stops outputting the first level signal, so that the first sub-stretching signal at a high level is generated in the first period of time t01; the gate electrode of the second electronic switch is turned on at the time t1 when the second sub-transmitting signal is received, so that the drain electrode of the second electronic switch outputs the first level signal, the gate electrode of the second electronic switch is turned off at time t2 when the first sub-transmitting signal is not received, so that the drain electrode of the second electronic switch stops outputting the first level signal, thereby the second sub-stretching signal at a high level is generated in the second period of time t12.

In the application, the first stretching unit composed of the first electronic switch and the second stretching unit composed of the second electronic switch have the advantages of simple structure, easy control, stable output and low cost, which can improve the stability of the driving circuit and reduce the production cost of the display panel.

Embodiment 4

Figure 6:
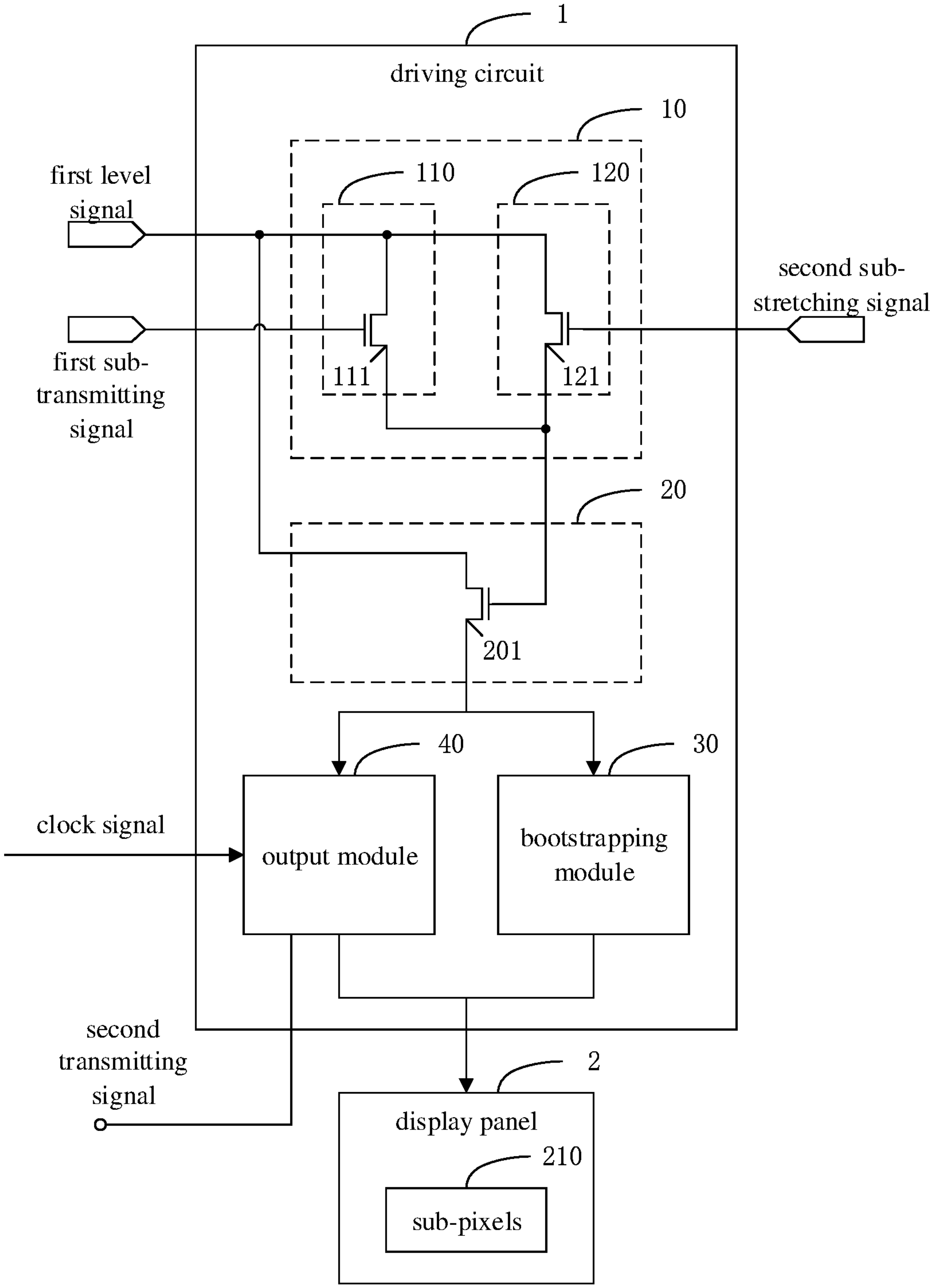
FIG. 6 is a fourth structural schematic diagram of a driving circuit of a display panel provided by an embodiment of the present application.

As shown in FIG. 6, based on the embodiment 3 corresponding to FIG. 5, in the driving circuit 1 of the display panel provided in the embodiment 4 of the present application, the control circuit 20 includes: a third electronic switch 201, and the gate electrode of the third electronic switch 201 is respectively connected to the drain electrode of the first electronic switch 111 and the drain electrode of the second electronic switch 121, and the drain electrode of the third electronic switch 201 is electrically connected to the bootstrapping circuit 30 and the output circuit 40 respectively; and a source electrode of the third electronic switch 201 is configured to receive the first level signal, and when the gate electrode of the third electronic switch 201 receives the stretching signal, the drain electrode of the third electronic switch 201 is configured to generate a control signal according to the first level signal, and to send the control signal to the bootstrapping circuit 30 and the output circuit 40.

In the application, the selection of the third electronic switch is the same as the selection of the first electronic switch and the second electronic switch, which is not repeated here.

The working principle of the third electronic switch will be described below with reference to the timing sequence diagram of FIG. 4:

The source electrode of the third electronic switch is configured to receive the first level signal; the gate electrode of the third electronic switch is turned on at the time t0 when the stretching signal is received, so that the drain electrode of the third electronic switch outputs the first level signal, and the gate electrode of the third electronic switch is turned off at time t2 when the first sub-transmitting signal is not received, so that the drain electrode of the third electronic switch stops to output the first level signal, so that the control signal at a high level in the first period of time t01 and the second period of time t12 is continuously generated.

In the application, the control circuit formed by the third electronic switch has the advantages of simple structure, easy control, stable output and low cost, and with the first and second stretching units having the same advantages, the stability of the driving circuit can be further improved and reduce the production cost of display panels.

Embodiment 5

Figure 7:
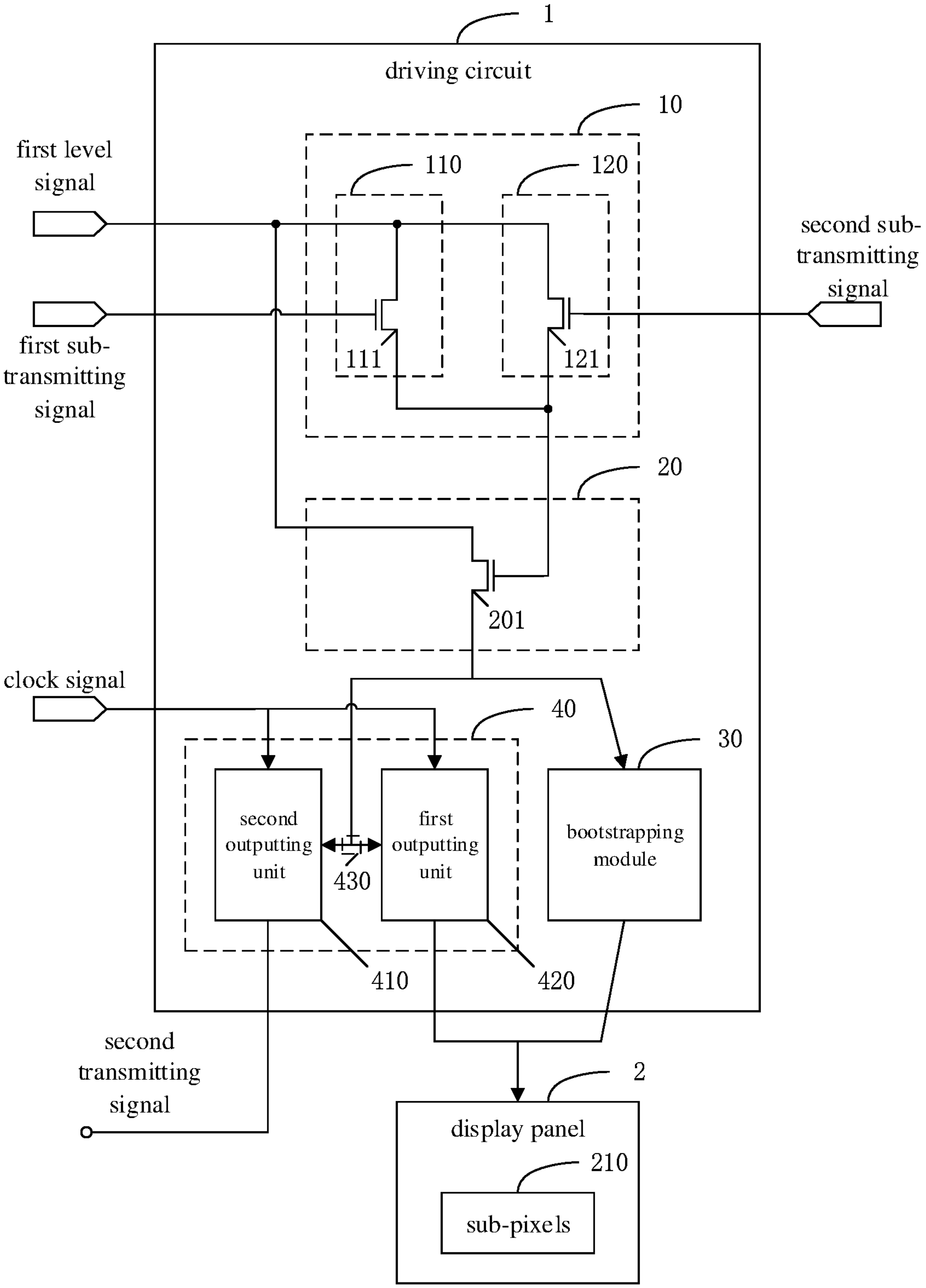
FIG. 7 is a fifth structural schematic diagram of a driving circuit of a display panel provided by an embodiment of the present application.

As shown in FIG. 7, based on the embodiment 4 corresponding to FIG. 6 and the driving circuit 1 of the display panel provided in the embodiment 5 of the present application, the output circuit 40 includes: a first outputting unit 410 and a second outputting unit 420. The first outputting unit 410 is electrically connected to the third electronic switch 201 and the bootstrapping circuit 30 respectively, the second outputting unit 420 is electrically connected to the third electronic switch 201 and the bootstrapping circuit 30 respectively, the input port of the first outputting unit 410 is electrically connected to the input port of the second outputting unit 420 to form the input port 430 of the output circuit 40;

the first outputting unit 410 is configured to receive the clock signal, and to generate a gate driving signal according to the clock signal when the bootstrap signal is received, and to send the gate driving signal to the sub-pixels 210 of the display panel 2;

the second outputting unit 420 is configured to receive the clock signal, and to generate a second transmitting signal according to the clock signal when the bootstrap signal is received, and to send he second transmitting signal; and the second outputting unit 420 is further configured to receive the first sub-transmitting signal, and to discharge the clock signal when the control signal and the clock signal are received.

In the application, the output circuit can include a plurality of outputting units, and the working principle of each outputting unit is consistent with the working principle of the output circuit provided in the foregoing embodiments, and the number of outputting units can be determined according to the number of outputting objects connected to the output circuit. Each of the outputting units is used to provide an independent signal to an outputting object.

Figure 8:
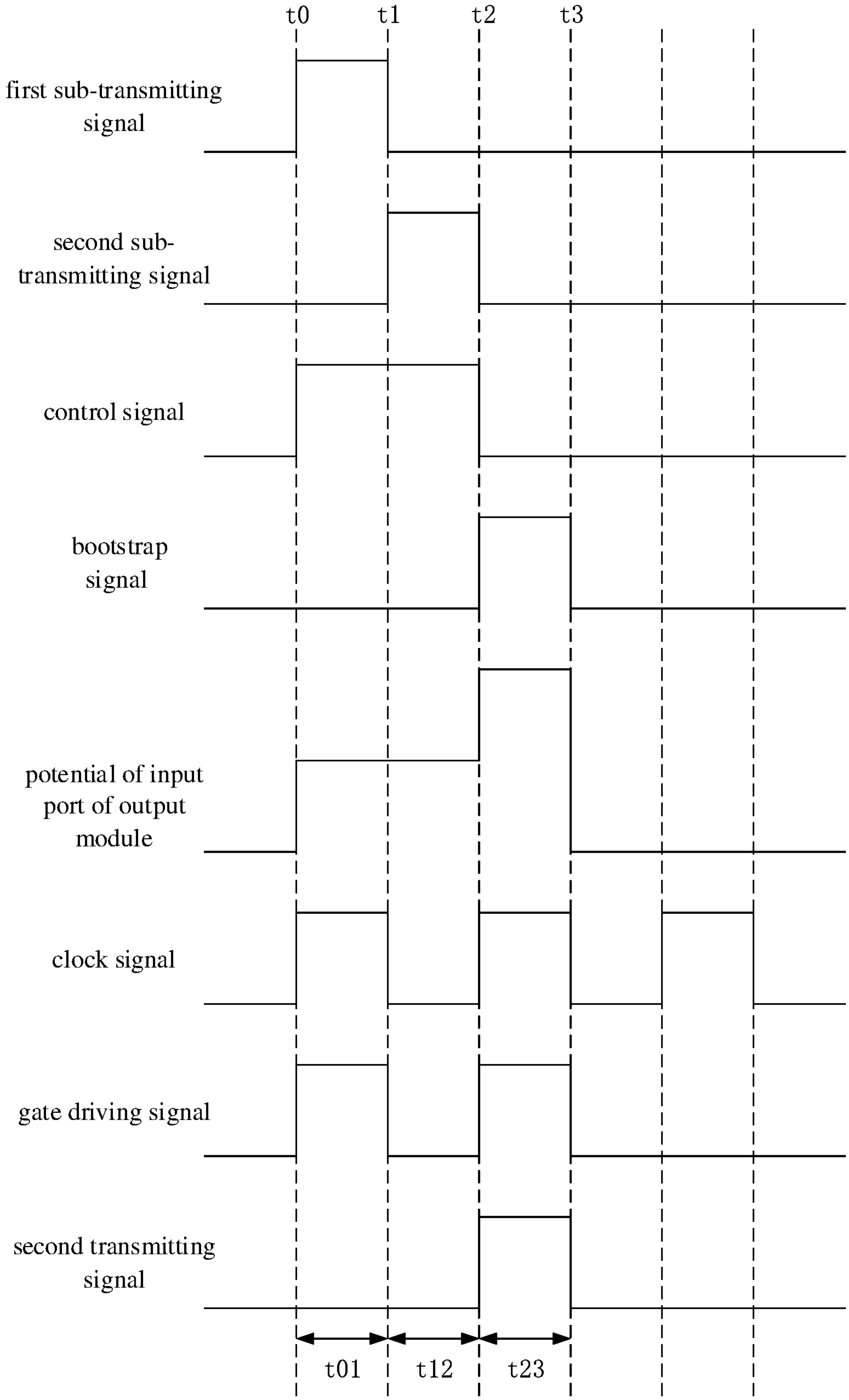
FIG. 8 is a schematic timing sequence diagram of a first sub-transmitting signal, a second sub-transmitting signal, a control signal, a bootstrap signal, a potential of an input port of an output circuit, a clock signal, a gate driving signal, and a second transmitting signal provided by an embodiment of the present application.

FIG. 8 exemplarily shows the timing sequence diagram of a first sub-transmitting signal, a second sub-transmitting signal, a control signal, a bootstrap signal, a potential of an input port of the output circuit, a clock signal, a gate driving signal, and a second transmitting signal; and the working principle of the first outputting unit and the second outputting unit will be described below with reference to FIG. 8:

The first outputting unit and the second outputting unit keep receiving the clock signal; the first outputting unit can start charging at the time t0 when the control signal is received and continue to be charged at the time t2, so as to pull up the potential of the input port of the first outputting unit to the first high potential, so that the first outputting unit outputs an unstable gate driving signal in the first period of time t01; at time t2, the first outputting unit does not receive the control signal (the control signal is switched from a high level to a low level), and when the first outputting unit receives the bootstrap signal, the potential of the input port of the first outputting unit is further pulled up to the second high potential, so that the first outputting unit is fully turned on and starts to output a stable gate driving signal; the first outputting unit is turned off and stops to output the clock signal at time t3 when the bootstrap signal is not received, so as to keep outputting a stable gate driving signal in the third period of time t23. The working principle of the second outputting unit is the same as that of the first outputting unit, and which will not be repeated here. The difference is that the second outputting unit can discharge the clock signal in the period of time t01, so as not to output the second transmitting signal, and the second outputting unit can output the stable second transmitting signal in the third period of time t23. The potentials of the input port of the first outputting unit, the input port of the second outputting unit, and the input port of the output circuit are equal, and the potential magnitude of the input port of the output circuit is determined according to the voltage of the control signal and the voltage of the bootstrap signal, and the voltage of the control signal and the voltage of the bootstrap signal can be adjusted according to actual needs.

Embodiment 6

Figure 9:
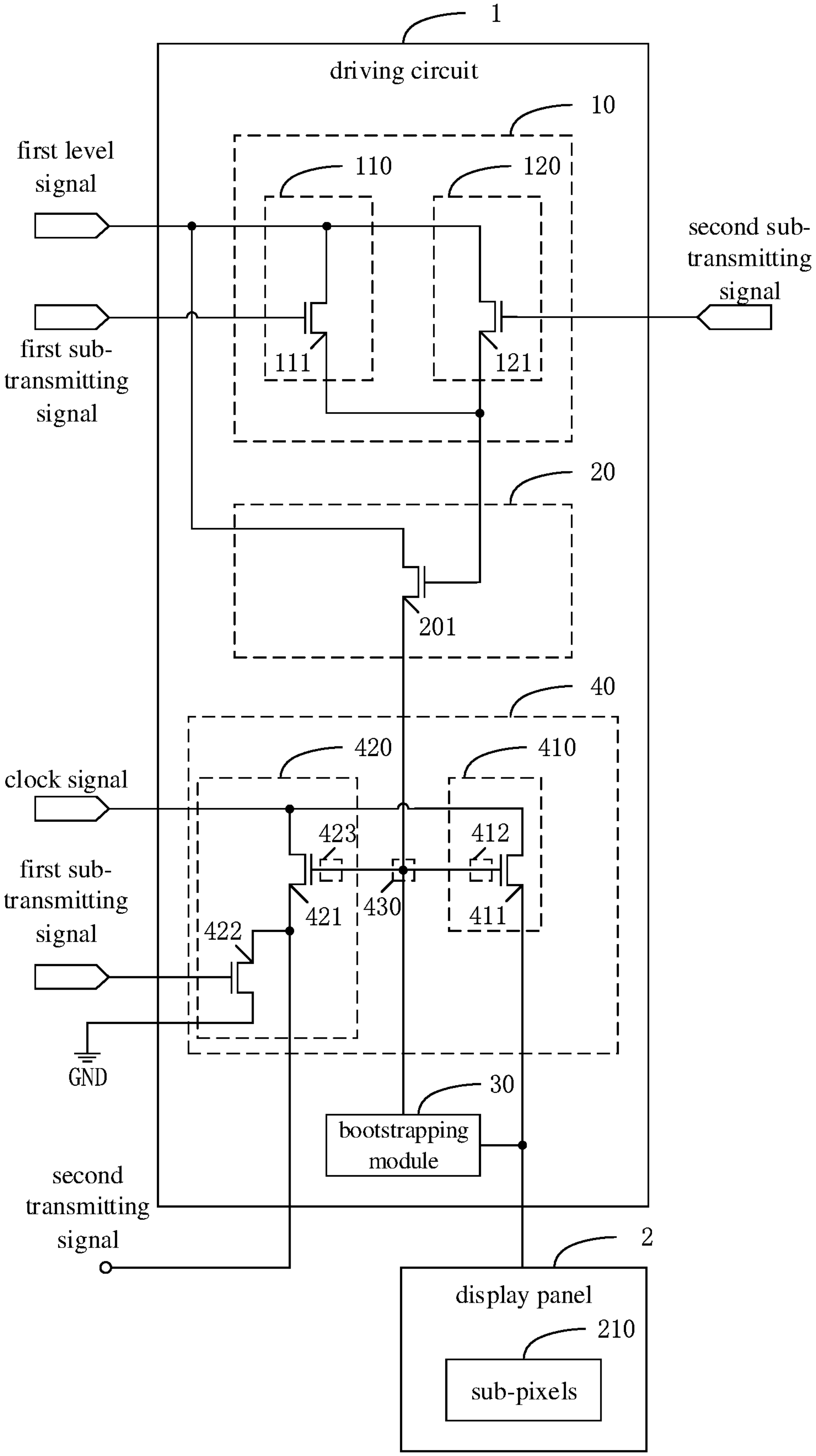
FIG. 9 is a sixth schematic structural diagram of a driving circuit of a display panel provided by an embodiment of the present application.

As shown in FIG. 9, based on the embodiment 5 corresponding to FIG. 7, the driving circuit 1 of the display panel provided in the embodiment 6 of the present application, the first outputting unit 410 includes: a fourth electronic switch 411, and the second outputting unit 420 includes: a fifth electronic switch 421 and a sixth electronic switch 422;

a gate electrode of the fourth electronic switch 411 is connected to a drain electrode of the third electronic switch 201, a drain electrode of the fourth electronic switch 411 is connected to the sub-pixels 210 of the display panel 2, the gate electrode of the fourth electronic switch 411, the drain electrode of the fourth electronic switch 411, and a gate electrode of the fifth electronic switch 421 are respectively electrically connected to the bootstrapping circuit 30, and the gate electrode of the fourth electronic switch 411 constitutes the input port 412 of the first outputting unit 410;

a gate electrode of the fifth electronic switch 421 is connected to the drain electrode of the third electronic switch, a drain electrode of the fifth electronic switch 421 is connected to a source electrode of the sixth electronic switch 422, and the gate electrode of the fifth electronic switch 421 constitutes the input port 423 of the second outputting unit;

a source electrode of the fourth electronic switch 411 is configured to receive the clock signal, and when the gate electrode of the fourth electronic switch 411 receives the bootstrap signal, the drain electrode of the fourth electronic switch 411 is configured to generate a gate driving signal according to the clock signal, and to send the gate driving signal to the display panel 2;

a source electrode of the fifth electronic switch 421 is configured to receive the clock signal, and when the gate electrode of the fifth electronic switch 421 receives the bootstrap signal, the drain electrode of the fifth electronic switch 421 is configured to generate the second transmitting signal according to the clock signal, and to send the second transmitting signal; and a gate electrode of the sixth electronic switch 422 is configured to receive the first sub-transmitting signal, and when gate electrode of the fifth electronic switch 421 receives the control signal and the source electrode of the fifth electronic switch 421 receives the clock signal, the a drain electrode of the sixth electronic switch 422 is configured to discharge the clock signal according to the first sub-transmitting signal.

In the application, the selections of the fourth electronic switch and the fifth electronic switch are the same as the selection of the first electronic switch and the second electronic switch, which are not repeated here.

The working principles of the fourth electronic switch, the fifth electronic switch and the sixth electronic switch will be described below with reference to the timing sequence diagram of FIG. 8:

The source electrode of the fourth electronic switch and the source electrode of the fifth electronic switch keep receiving the clock signal; the gate electrode of the fourth electronic switch can start charging at time t0 when the control signal is received and continue to be charged at time t2, so as to pull up the potential of the gate electrode of the fourth electronic switch to the first high potential, so that the drain electrode of the fourth electronic switch outputs an unstable gate driving signal in the first period of time t01; at time t2, the gate electrode of the fourth electronic switch does not receive the control signal (the control signal is switched from a high level to a low level), and when the gate electrode of the fourth electronic switch receives the bootstrap signal, the potential of the input port of the gate electrode of the fourth electronic switch is further pulled up to the second high potential, so that the fourth electronic switch is fully turned on and starts to output a stable gate driving signal; the gate electrode of the fourth electronic switch is turned off and stops to output the clock signal at time t3 when the bootstrap signal is not received, and the drain electrode of the fourth electronic switch stops to output the clock signal, so that the drain electrode of the fourth electronic switch keeps outputting a stable gate driving signal in the third period of time t23. The working principle of the fifth electronic switch is the same as that of the fourth electronic switch, and which will not be repeated here. The difference is that the gate electrode of the sixth electronic switch receives the first sub-transmitting signal in the first period of time, so that the sixth electronic switch is turned on and discharges the clock signal, so that the fifth electronic switch does not to output the second transmitting signal, and the fifth electronic switch can output the stable second transmitting signal in the third period of time t23.

In the application, the first outputting unit formed by the fourth electronic switch and the second outputting unit formed by the fifth electronic switch and the sixth electronic switch have the advantages of simple structure, easy control, stable output and low cost, and when cooperating with the first stretching unit, the second stretching unit and the control circuit with the same advantages, the stability of the driving circuit can be further improved and the production cost of the display panel can be reduced.

Embodiment 7

Figure 10:
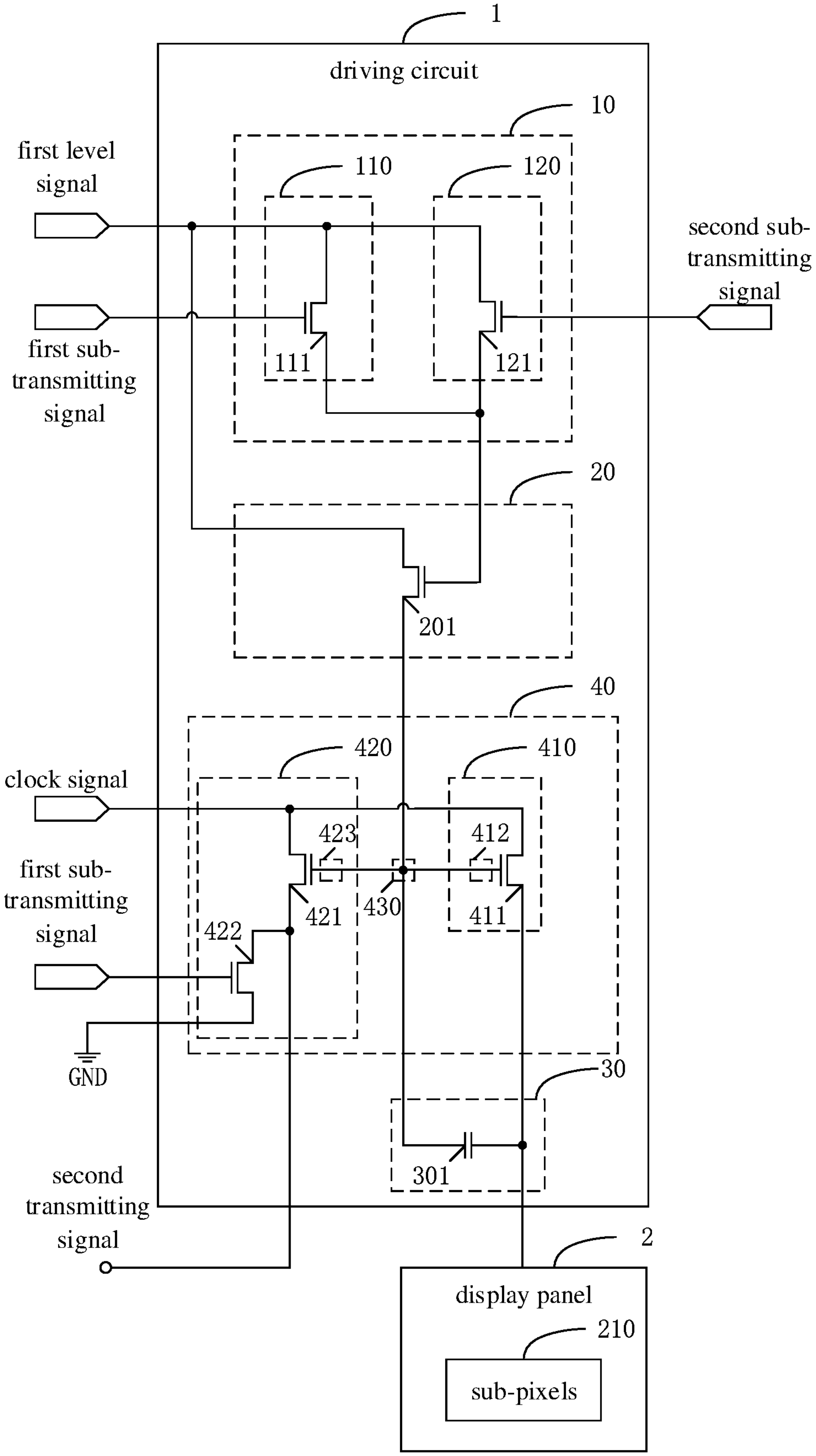
FIG. 10 is a seventh structural schematic diagram of a driving circuit of a display panel provided by an embodiment of the present application.

As shown in FIG. 10, based on the sixth embodiment 6 corresponding to FIG. 9, in the driving circuit 1 of the display panel provided in the embodiment 7 of the present application, the bootstrapping circuit 30 includes a first capacitor 301, and a first terminal of the first capacitor 301 is respectively connected to the drain electrode of the third electronic switch 201, the gate electrode of the fourth electronic switch 411, and the gate electrode of the fifth electronic switch 421; and the second terminal of the first capacitor 301 is connected to the drain electrode of the fourth electronic switch 411 and the display panel respectively;

the first terminal of the first capacitor 301 is configured to receive the control signal, and the first capacitor 301 is charged when the control signal is at a high level; and the first terminal of the first capacitor 301 is further configured to send the bootstrap signal to a gate electrode of the fourth electronic switch 411 and a gate electrode of the fifth electronic switch 421 when the control signal is switched to a low level, so as to pull up the gate electrode of the fourth electronic switch 411 and the gate electrode of the fifth electronic switch 421 to the second high potential.

In the application, the maximum amount of charge that can be accumulated by the first capacitor can be determined according to the capacitance value of the first capacitor. The greater the capacitance value of the first capacitor, the greater the potential difference between the second high potential and the first high potential, where the capacitance value of the first capacitor can be adjusted according to actual needs, and the second high potential is greater than or equal to the preset potential.

The working principle of the first capacitor will be described below with reference to the timing sequence diagram of FIG. 8:

The first terminal of the first capacitor starts to charge at time t0 when the control signal at the high level is received, so that the first capacitor accumulates charge, and the charging continues until time t2 when the control signal switches from the high level to the low level, at time t2, the first terminal of the first capacitor discharges the charges accumulated in the first period of time t01 and the second period of time t12, that is, the bootstrap signal is sent to the gate electrode of the fourth electronic switch and the gate electrode of the fifth electronic switch, so as to pull up the gate electrode of the fourth electronic switch and the gate electrode of the fifth electronic switch to the second high potential.

In the application, the capacitor can be used as the energy storage element of the bootstrapping circuit to perform fast and stable cyclic charging and discharging, which can improve the durability and reliability of the driving circuit while ensuring the charging efficiency and charging speed of the driving circuit.

Embodiment 8

Figure 11:
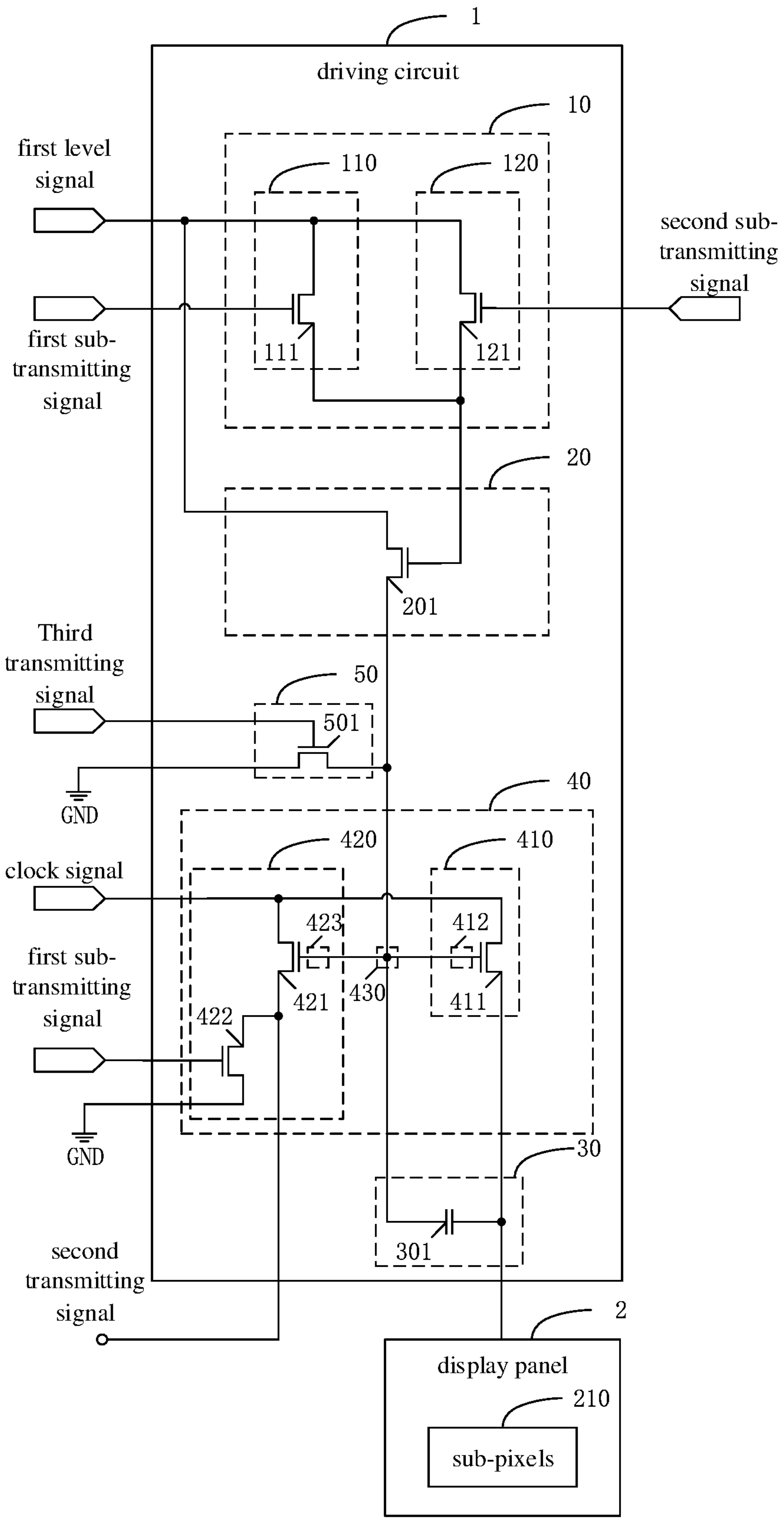
FIG. 11 is an eighth structural schematic diagram of a driving circuit of a display panel provided by an embodiment of the present application.

As shown in FIG. 11, based on the embodiment 7 corresponding to FIG. 10, the driving circuit 1 of the display panel provided in the embodiment 8 of the present application further includes a reset module 50, which is respectively electrically connected with the control circuit 20 and the bootstrapping circuit 30, and the output circuit 40;

the reset module 50 is configured to receive the control signal, and to send the control signal to the ground terminal when a third transmitting signal is received;

the reset module 50 includes a seventh electronic switch 501, a source electrode of the seventh electronic switch 501 is respectively connected with a drain electrode of a third electronic switch 201 and a gate electrode of a fourth electronic switch 411, and a gate electrode of a fifth electronic switch 421 is connected to the first terminal of the first capacitor; and a source electrode of the seventh electronic switch 501 is configured to receive the control signal, and when a gate electrode of the seventh electronic switch 501 receives the third transmitting signal, a drain electrode of the seventh electronic switch 501 is configured to send the control signal to the ground terminal.

In the application, the third transmitting signal can be sent to the reset module at any time after the output circuit sends the gate driving signal and the second transmitting signal, and the specific sending time can be a time when the gate driving signal or the second transmitting signal is switched to a low level, which can also be at one-sixth cycle of the clock signal after the gate driving signal or the second transmitting signal is switched to a low level, the reset module can send the control signal to the ground terminal when the third transmitting signal is received, to prevent the control circuit from continuing to output the control signal outside the first period of time and the second period of time, and to export the control signal remaining in the driving circuit to make the potential of the input port of the output circuit return to zero, so as to improve the stability of the control signal output by the control circuit and the operation of the stability of the driving circuit.

In one embodiment, the reset module is further configured to receive a bootstrap signal when the third transmitting signal is received, send the bootstrap signal to the ground terminal.

In the application, the third transmitting signal can also be sent to the reset module at any time after the bootstrapping circuit sends the bootstrap signal, and the specific sending time can be a time when the bootstrap signal is switched to a low level, which can also be at one-sixth cycle of the clock signal after the bootstrap signal is switched to a low level, the reset module can send the control signal to the ground terminal when the third transmitting signal is received, to prevent the bootstrapping circuit from continuing to output the bootstrap signal outside the third period of time, and to export the bootstrap signal remaining in the driving circuit to make the potential of the input port of the output circuit return to zero, so as to improve the stability of the bootstrap signal output by the bootstrapping circuit and the operation of the stability of the driving circuit.

In the application, the selection of the seventh electronic switch is the same as the selection of the above-mentioned first electronic switch and the second electronic switch, and which are not repeated here.

Figure 12:
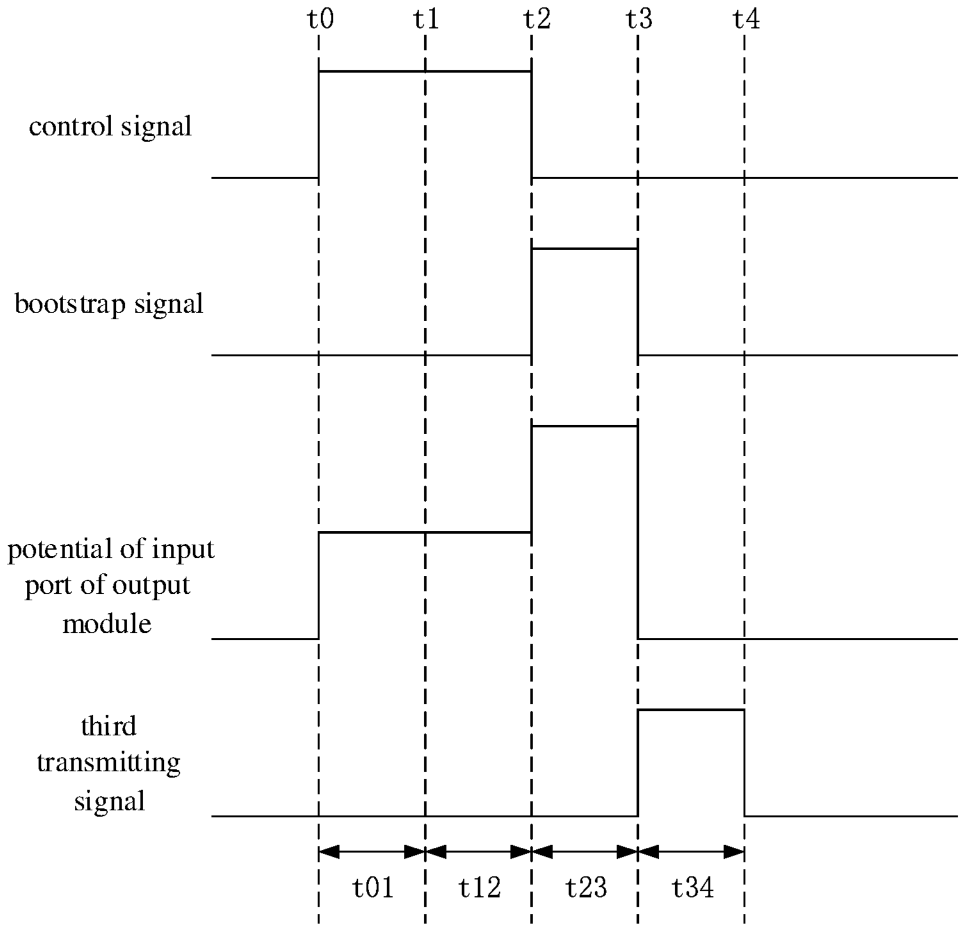
FIG. 12 is a schematic timing sequence diagram of a control signal, a bootstrap signal, a potential of an input port of an output circuit, and a third transmitting signal sent to a reset module when the third transmitting signal provided by the embodiment of the present application is switched to a low level.

FIG. 12 exemplarily shows a timing sequence diagram of a control signal, a bootstrap signal, a potential of an input port of the output circuit and the third transmitting signal sent to the reset module when the third transmitting signal is switched to a low level.

The working principle of the seventh electronic switch will be described below with reference to FIG. 12:

The source electrode of the seventh electronic switch keeps receiving the control signal and the bootstrap signal; the gate electrode of the seventh electronic switch is turned on at time t3 when the third transmitting signal is received and send the bootstrap signal to the ground terminal, and the gate electrode of the seventh electronic switch is turned off at time t4 and stops to send the bootstrap signal to the ground terminal when the third transmitting signal is not received; so that the bootstrap signal is sent to the ground terminal in the fourth period of time t34, so that the potential of the input port of the output circuit returns to zero, and the time duration of the third transmitting signal can be adjusted according to actual needs.

Embodiment 9

Figure 13:
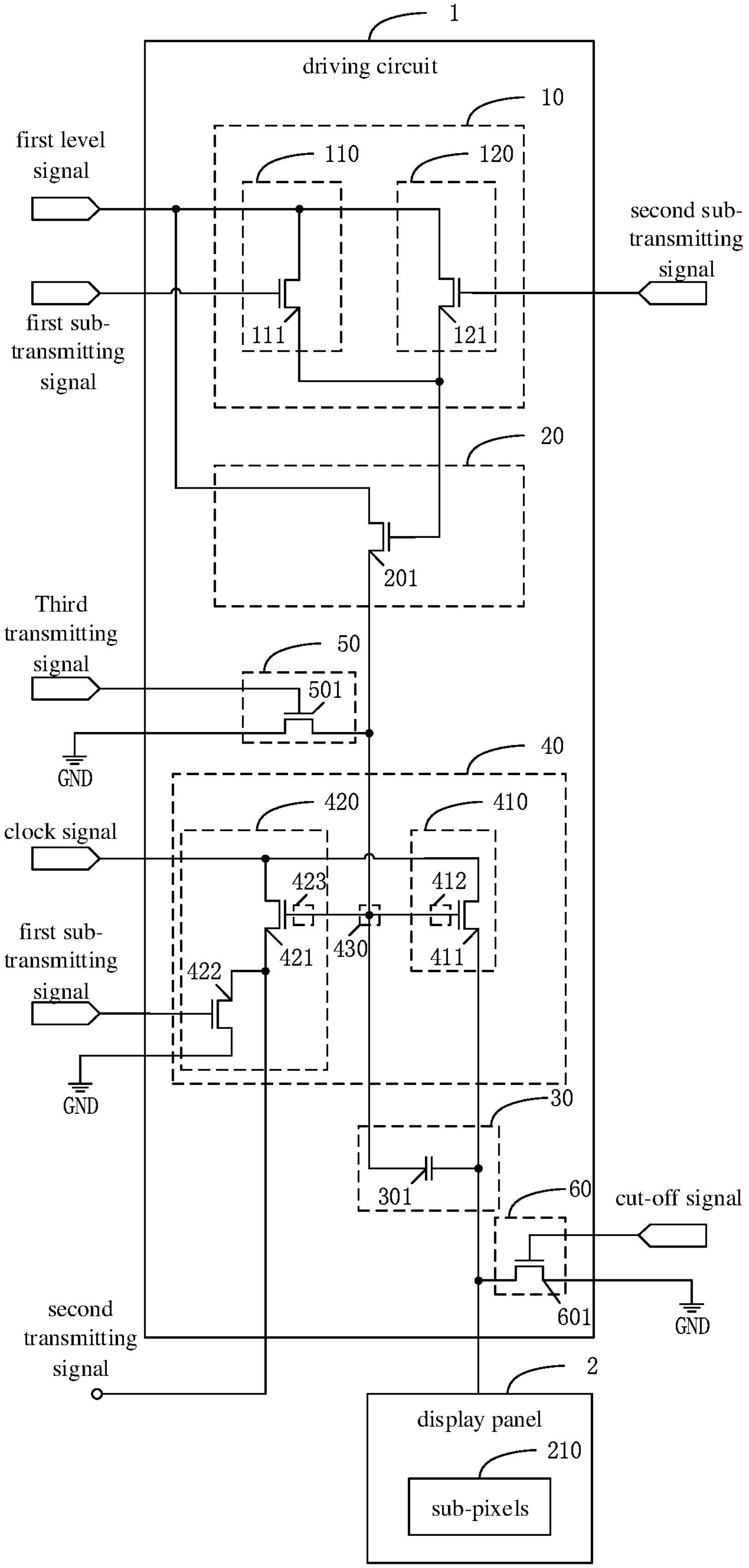
FIG. 13 is a ninth structural schematic diagram of a driving circuit of a display panel provided by an embodiment of the present application.

As shown in FIG. 13, based on the embodiment 8 corresponding to FIG. 11, the driving circuit 1 of the display panel provided in the embodiment 9 of the present application further includes a cut-off module 60, and the cut-off module 60 is electrically connected to the output circuit;

- the cut-off module 60 is configured to receive the gate driving signal, and to send the gate driving signal to the ground terminal when the cut-off signal is received;
- the cut-off module 60 includes an eighth electronic switch 601;
- a source electrode of the eighth electronic switch 601 is connected to the drain electrode of the fourth electronic switch 411 and the second terminal of the first capacitor 301 respectively;
- the source electrode of the eighth electronic switch 601 is configured to receive the gate driving signal, and when the gate electrode of the eighth electronic switch 601 receives the cut-off signal, a drain electrode of the eighth electronic switch 601 is configured to send the gate driving signal to the ground terminal.

In the application, the selection of the eighth electronic switch is consistent with the selection of the above-mentioned first electronic switch and the second electronic switch, and which are not repeated here.

In the application, the cut-off signal can be an inverted signal of the control signal, and the cut-off signal can be obtained by inputting the control signal of the driving circuit to an inverter, and the type of the inverter can be Transistor-Transistor Logic (TTL) NOT gate, Complementary Metal Oxide Semiconductor (CMOS) inverter. The cut-off signal is used to ground the second outputting unit during the period when the output circuit is not being charged, so as to avoid sending redundant or residual gate driving signals to the display panel, which can improve the stability of the outputting of the gate driving signals, thereby improving the display effect of the display panel.

The driving circuit of the display panel provided by the embodiment of the present application includes: a stretching circuit, a control circuit, a bootstrapping circuit, and an output circuit; the control circuit is respectively electrically connected to the stretching circuit, the bootstrapping circuit and the output circuit, and the bootstrapping circuit is electrically connected to the output circuit; the stretch signal generated by the stretching circuit can make the bootstrapping circuit have enough time to charge, to ensure that the output circuit can reach or exceed the preset potential when the bootstrap signal is received, so as to avoid voltage instability when outputting the gate driving signal and avoid the phenomenon that the outputting of the gate driving signal is terminated in advance, to improve the stability of the outputting of the gate driving signal, thereby improving the display brightness and the stability of the display effect of the display panel while improving the refresh rate and resolution of the display panel.

Embodiment 10

Figure 14:
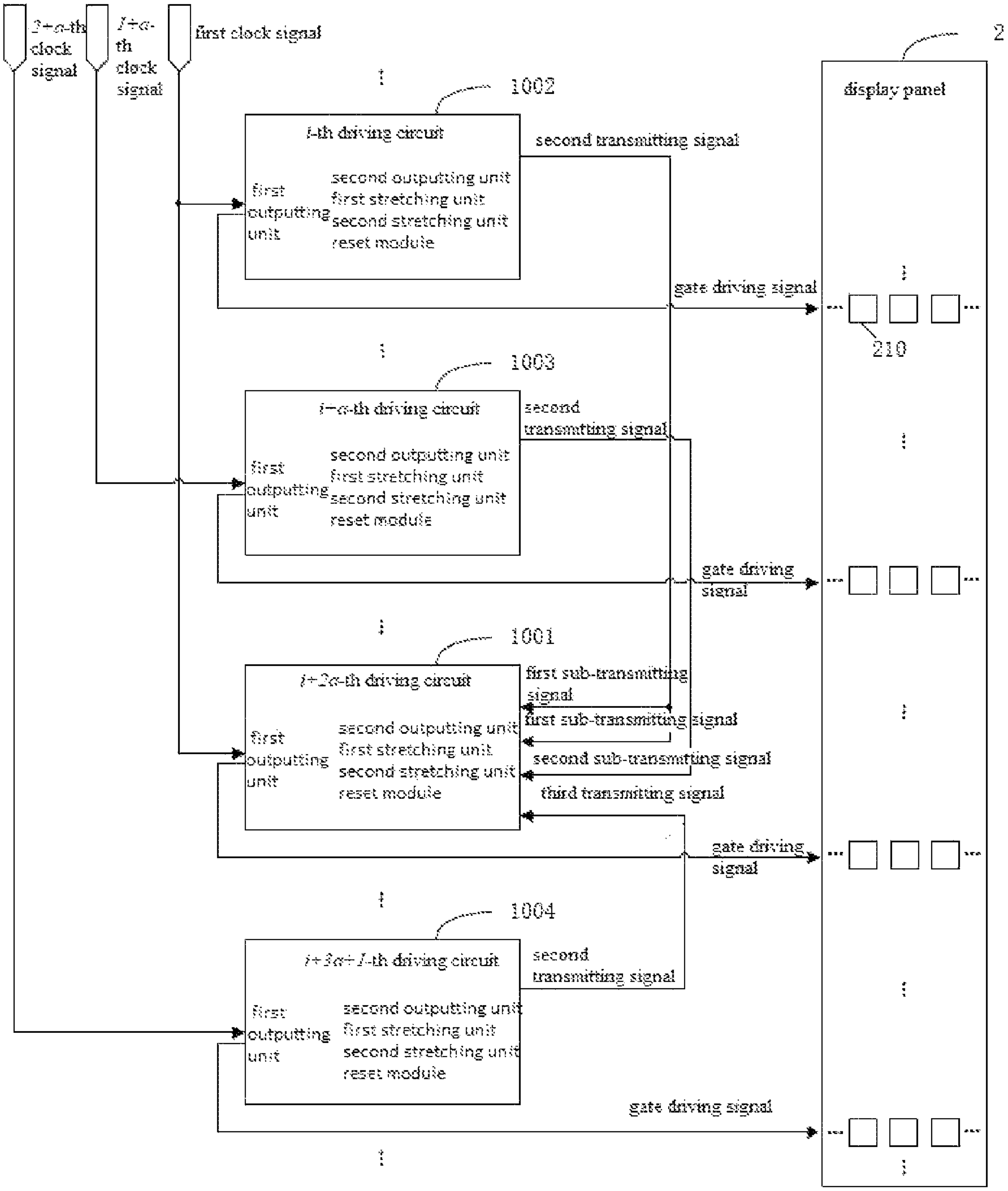
FIG. 14 is a first structural schematic diagram of a driving device for a display panel provided by an embodiment of the present application.

As shown in FIG. 14, the drive device for a display panel provided in the embodiment 10 of the present application includes 2a clock signal generators and n driving circuits provided in the above-mentioned first to eighth embodiments;

- a j-th clock signal generator is connected to an output circuit of a j+2ka-th driving circuit, a first stretching unit of a i+2a-th driving circuit 1001 is connected to a second outputting unit of the i-th driving circuit 1002, and a second outputting unit of the i+2a-th driving circuit 1001 is connected to a second outputting unit of a i-th driving circuit 1002, and a second stretching unit of a i+2a-th driving circuit 1001 is connected to a second outputting unit of a i+a-th driving circuit 1003;
- the j-th clock signal generator is configured to generate a clock signal and send the clock signal to the output circuit of the j+2ka-th driving circuit, and a phase difference between a clock signal generated by the j-th clock signal generator and a clock signal generated by the j+1-th clock signal generator is $\pi/2a$;

the first stretching unit of the i+2a-th driving circuit 1001 is configured to send a first sub-stretching signal to the control circuit when the first sub-transmitting signal sent by the second outputting unit of the i-th driving circuit 1002 is received; and the second stretching unit of the i+2a-th driving circuit 1001 is configured to send a second sub-stretching signal to the control circuit when the second sub-transmitting signal sent by the second outputting unit of the i+a-th driving circuit 1003 is received.

In the embodiment, a is an integer greater than or equal to 1; n is an integer greater than 2a; i is greater than or equal to 1 and less than or equal to n−2a; j=1,2, . . . ,2a; k=0,1, 2, . . . ,(n/2a); and j+2ka is less than or equal to n.

FIG. 14 exemplarily shows a schematic structural diagram when the i-th driving circuit receives the clock signal sent by the first clock signal generator, and shows the input-output relationship between the first sub-transmitting signal, the second sub-transmitting signal and the third transmitting signal.

In the application, the driving device includes n cascaded driving circuits, and the first outputting unit of each driving circuit is connected with the sub-pixels of the display panel; the number of driving circuits is determined according to the number of rows of sub-pixels of the display panel, for example, the number of the driving circuits can be equal to the number of the rows of sub-pixels of the display panel, or equal to the number of the rows of the sub-pixels of the display panel plus 2a.

In the application, the gate driving signal can be sequentially sent to the sub-pixels in the first row to the sub-pixels in the n-th row of the display panel according to the sequence from the first driving circuit to the n-th driving circuit. The time interval between the gate driving signal sent last time and the gate driving signal sent nest time is π/2a. In an embodiment, the time interval of the above gate driving signals is determined according to the number of clock signal generators, and the number of clock signal generators can be determined according to the actual performance of the display panel; TCON or SOC can send a high level signal consistent with waveform of the stretching signal to the control circuit of any driving circuit when it needs to output the gate driving signal through the driving device to trigger the driving device to start working.

The following takes a=3, n=7 and a=1, n=4 as examples to illustrate the connection relationship between the driving circuits in the driving device:

In an embodiment, when a=3 and n=7, the driving device includes 6 clock signal generators and 7 driving circuits, and the first clock signal generator to the sixth clock signal generator are respectively in a one-to-one correspondence connection with the first outputting unit of the first driving circuit to the first outputting unit of the sixth driving circuit; and the first clock signal generator is further connected to the seventh driving circuit; the second outputting unit of the first (i) driving circuit is respectively connected with the second stretching unit of the fourth (i+a) driving circuit, the first stretching unit of the seventh (i+2a) driving circuit, and the second outputting unit of the seventh (i+2a) driving circuit, and sends second transmitting signal; the second outputting unit of the second driving circuit is respectively connected with the second stretching unit of the fifth driving circuit, the first stretching unit of the first driving circuit, and the second outputting unit of the first driving circuit, and sends the second transmitting signal; the second outputting unit of the third driving circuit is respectively connected with the second stretching unit of the sixth driving circuit, the first stretching unit of the second driving circuit, and the second outputting unit of the second driving circuit, and sends the second transmitting signal; the second outputting unit of the fourth driving circuit is respectively connected with the second stretching unit of the seventh driving circuit, the first stretching unit of the third driving circuit, and the second stretching unit of the third driving circuit, and sends the second transmitting signal; the second outputting unit of the fifth driving circuit is respectively connected with the second stretching unit of the first driving circuit, the first stretching unit of the fourth driving circuit, and the second outputting unit of the fifth driving circuit, and sends the second transmitting signal; the second outputting unit of the sixth driving circuit is respectively connected with the second stretching unit of the second driving circuit, the first stretching unit of the fifth driving circuit, and the second outputting unit of the fifth driving circuit, and sends the second transmitting signal; the second outputting unit of the seventh driving circuit is respectively connected with the second stretching unit of the third driving circuit, the first stretching unit of the sixth driving circuit, the second outputting unit if the sixth driving circuit, and sends the second transmitting signal.

In an embodiment, when a=1 and n=4, the driving device includes 2 clock signal generators and 4 driving circuits, the first clock signal generator is respectively connected with the first outputting unit of the first driving circuit and the first outputting unit of the third driving circuit, and the second clock signal generator is respectively connected with the first outputting unit of the second driving circuit and the first outputting unit of the fourth driving circuit;

the second outputting unit of the first (i) driving circuit is respectively connected with the second stretching unit of the second (i+a) driving circuit, the first stretching unit of the third (i+2a) driving circuit, and the second outputting unit of the third (i+2a) driving circuit, and sends second transmitting signal; the second outputting unit of the second driving circuit is respectively connected with the second stretching unit of the third driving circuit, the first stretching unit of the fourth driving circuit, and the second outputting unit of the fourth driving circuit, and sends the second transmitting signal; the second outputting unit of the third driving circuit is respectively connected with the second stretching unit of the fourth driving circuit, the first stretching unit of the first driving circuit, and the second outputting unit of the first driving circuit, and sends the second transmitting signal; the second outputting unit of the fourth driving circuit is respectively connected with the second stretching unit of the first driving circuit, the first stretching unit of the second driving circuit, and the second outputting unit of the second driving circuit, and sends the second transmitting signal.

In the application, the waveforms of the second transmitting signal and the stable gate driving signal generated by each driving circuit are the same; the first sub-transmitting signal and the second sub-transmitting signal of each driving circuit can be obtained according to the second transmitting signal sent by the remaining driving circuits of the driving device. In an embodiment, the second outputting unit of the i-th driving circuit is connected to the first stretching unit and the second outputting unit of the i+2a-th driving circuit, and can send the second transmitting signal to the first stretching unit and the second outputting unit of the i+2a-th driving circuit, so as to be the first sub-transmitting signal of the first stretching unit and the second outputting unit of the i+2a-th driving circuit; the second outputting unit of the i+a-th driving circuit is connected to the second stretching unit of the i+2a-th driving circuit, and can send the second transmitting signal to the second stretching unit of the i+2a-th driving circuit, so as to be the second sub-transmitting signal of the second stretching unit of the i+2a-th driving circuit.

In the application, since the phase difference between the clock signal generated by the j-th clock signal generator and the clock signal generated by the j+1-th clock signal generator is π/2a, and the clock signal generated by the j-th clock signal generator is sent to the output circuit of the j+2ka-th driving circuit, therefore, the phase difference between the stable gate driving signal (the second transmitting signal) generated by the i-th driving circuit and the stable gate driving signal (the second transmitting signal) generated by the i+1-th driving circuit is also π/2a, and the phase difference between the first sub-transmitting signal received by the i+2a-th driving circuit and the gate driving signal generated by the i+2a-th driving circuit is π/2, and the phase difference between the second sub-transmitting signal received by the i+2a-th driving circuit and the gate driving signal generated by the i+2a-th driving circuit is π. The working principle that the bootstrap signal generated according to the first sub-transmitting signal and the second sub-transmitting signal allows the bootstrapping circuit to have enough time to charge can refer to the working principles provided by the foregoing first to eighth embodiments, and which are not be repeated here.

Figure 15:
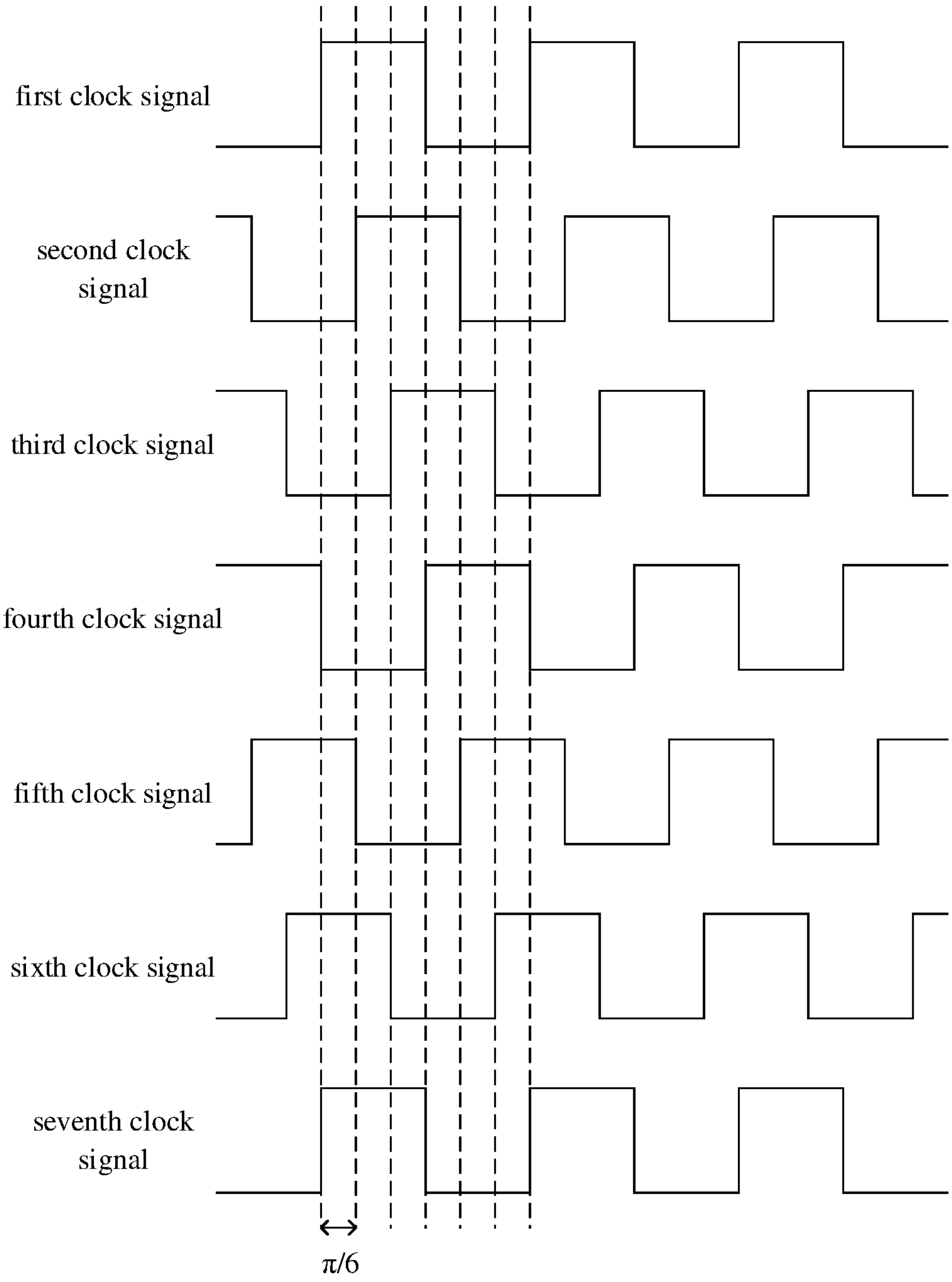
FIG. 15 is a schematic timing sequence diagram of a first clock signal generated by a first clock signal generator to a seventh clock signal generated by a seventh clock signal generator when a=3 provided by the embodiment of the present application.

FIG. 15 exemplarily shows a timing sequence diagram of the first clock signal generated by the first clock signal generator to the seventh clock signal generated by the seventh clock signal generator when a=3.

Figure 16:
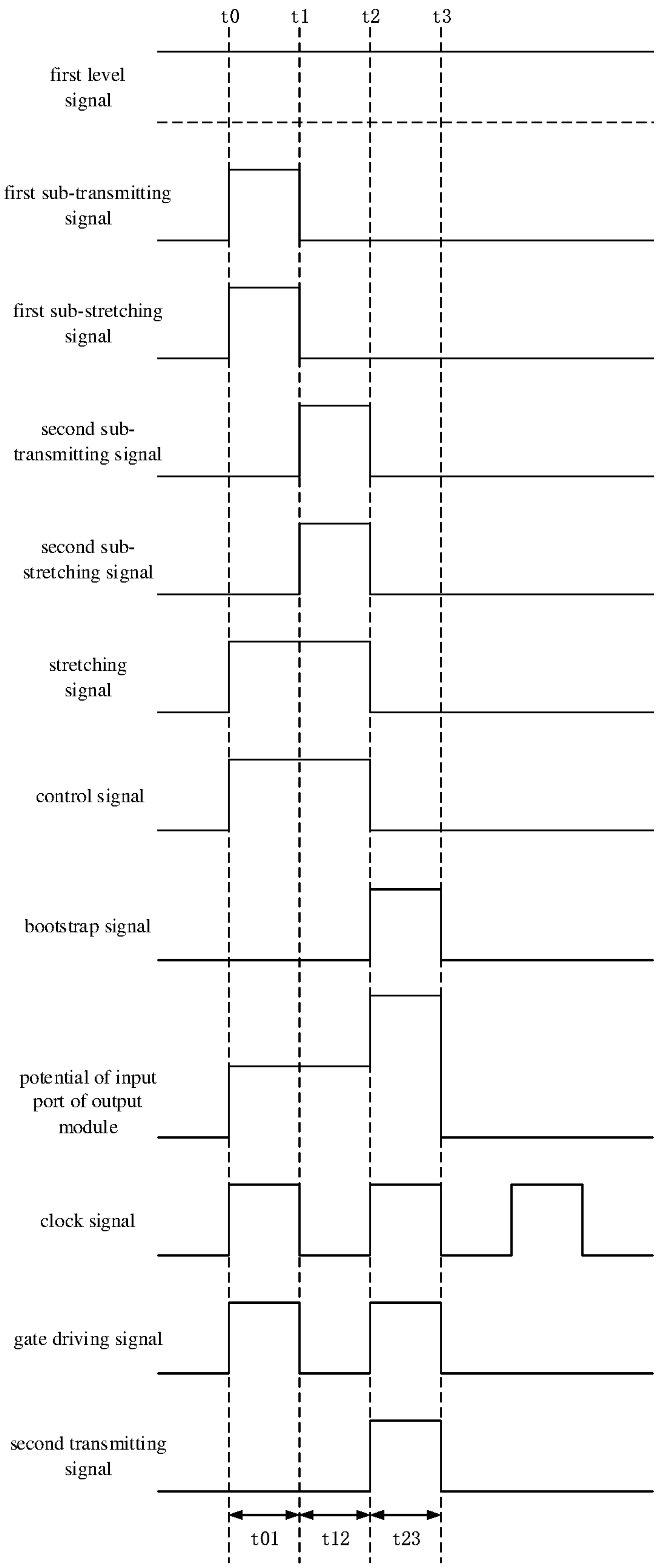
FIG. 16 is a schematic timing sequence diagram of a first level signal, a first sub-transmitting signal, a first sub-stretching signal, a second sub-transmitting signal, a second sub-stretching signal, a stretching signal, a control signal, a bootstrap signal, a potential of an input port of an output circuit, a clock signal, a gate driving signal, and a second transmitting signal of a i+2a-th driving circuit provided by the embodiment of the present application.

FIG. 16 exemplarily shows a timing sequence diagram of a first level signal, a first sub-transmitting signal, a first sub-stretching signal, a second sub-transmitting signal, a second sub-stretching signal, and a second sub-transmitting signal, a second sub-stretching signal, a stretching signal, a control signal, a bootstrap signal, a potential of an input port of the output circuit, a clock signal, a gate driving signal, and a second transmitting signal of the i+2a-th driving circuit.

In one embodiment, the j-th clock signal generator is connected to the output circuit of the j+2ka-th driving circuit, the first stretching unit of the i+2a-th driving circuit is connected to the second outputting unit of the i+1-th driving circuit, and the second stretching unit of the i+2-th driving circuit is connected to the second outputting unit of the i+a−1-th driving circuit;

The first stretching unit of the i+2a-th driving circuit is configured to send a first sub-stretching signal to the control circuit when the first sub-transmitting signal sent by the second outputting unit of the i+1-th driving circuit is received; and The second stretching unit of the i+2a-th driving circuit is configured to send a second sub-stretching signal to the control circuit when the second sub-transmitting signal sent by the second outputting unit of the i+a−1-th driving circuit is received.

Figure 17:
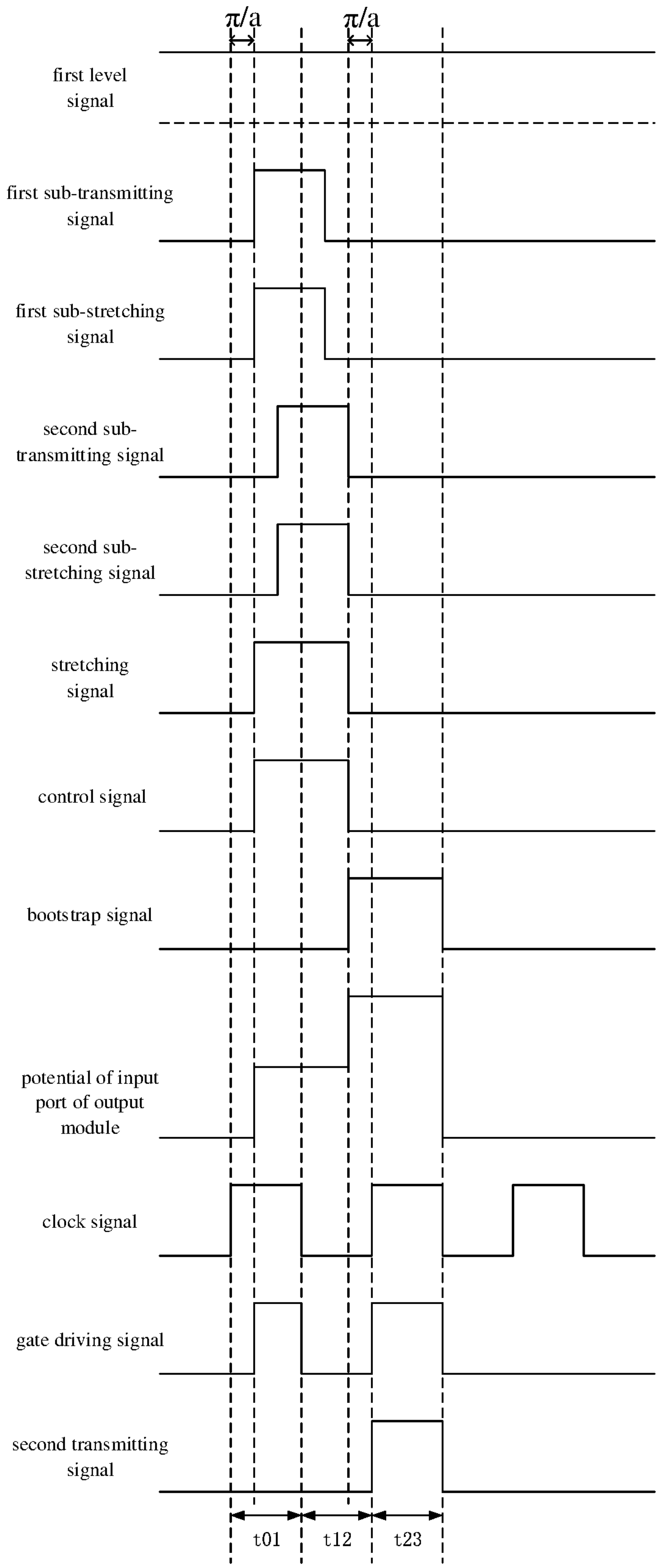
FIG. 17 is a schematic timing sequence diagram of a first level signal, a first sub-transmitting signal, a first sub-stretching signal, a second sub-transmitting signal, a second sub-stretching signal, a second sub-transmitting signal, a second sub-stretching signal, a stretching signal, a control signal, a bootstrap signal, a potential of an input port of an output circuit, a clock signal, a gate driving signal, and a second transmitting signal when a first stretching unit of a i+2a-th driving circuit receives a first sub-transmitting signal sent by a second outputting unit of a i+1-th driving circuit, and a second stretching unit of a i+2a-th driving circuit receives a second sub-transmitting signal sent by a second outputting unit of a i+a−1-th driving circuit provided by the embodiment of the present application.

FIG. 17 exemplarily shows a timing sequence diagram of a first level signal, a first sub-transmitting signal, a first sub-stretching signal, a second sub-transmitting signal, a second sub-stretching signal, and a second sub-transmitting signal, a second sub-stretching signal, a stretching signal, a control signal, a bootstrap signal, a potential of an input port of the output circuit, a clock signal, a gate driving signal, and a second transmitting signal when the first stretching unit of the i+2a-th driving circuit receives the first sub-transmitting signal sent by the second outputting unit of the i+1-th driving circuit, and the second stretching unit of the i+2a-th driving circuit receives the second sub-transmitting signal sent by the second outputting unit of the i+a−1-th driving circuit.

In the application, due to hardware limitations of the first electronic switch transmitting the first sub-stretching signal and the second electronic switch transmitting the second sub-stretching signal, the transmission of the first sub-stretching signal and the second sub-stretching signal may have a delay, thereby the composed stretching signal also has a delay, therefore, there is a risk that the control signal remains output after time t2, which results in the potential of the input port of the output circuit not being able to be pulled up to the second high potential in time in the third period of time t23, and affects the stability and time duration of the gate driving signal output in the third period of time t23.

In the application, in order to prevent the control signal from remaining output after time t2, on the premise that the time duration of the control signal can satisfy the potential of the input port of the output circuit to reach the second high potential, the connection relationship between the first stretching unit and the second stretching unit of the i+2a-th driving circuit can be adjusted. In an embodiment, the first stretching unit of the i+2a-th driving circuit is connected with the second outputting unit of the i+1-th driving circuit, and the second stretching unit of the i+2-th driving circuit is connected to the second outputting unit of the i+a−1-th driving circuit, to reduce the time duration of the stretching signal, and reserve a time of π/a to avoid the stretching signal remaining output after time t2.

In the application, by cascading the driving circuit and cooperating with the driving device composed of the clock signal generators, the input signal used is small and the structure is simple, so that the driving device can run stably and cyclically and continuously output gate driving signals with multiple timing sequences, which has the advantages of strong anti-interference performance, low cost and stable output.

Embodiment 11

As shown in FIG. 14, in the driving device provided in the embodiment 11 of the present application, the reset module of the i+2a-th driving circuit 1001 is connected to the second outputting unit of the i+3a+1-th driving circuit 1004;

The reset module of the i+2a-th driving circuit 1001 is configured to send the control signal to the ground terminal when the third transmitting signal sent by the second outputting unit of the i+3a+1-th driving circuit 1004 is received.

In the application, the reset module of the i+2a-th driving circuit is connected to the second outputting unit of the i+3a+1-th driving circuit, and can receive the second transmitting signal sent by the second outputting unit of the i+3a+1-th driving circuit, and the second transmitting signal is used as he third transmitting signal of the reset module of the i+2a-th driving circuit, and the second transmitting signal sent by the second outputting unit of each driving circuit can be further multiplexed, so as to improve the signal utilization and drive integration.

It should be noted that the reset module of the n-a-th driving circuit to the reset module of the n-th driving circuit do not have a corresponding output circuit to provide the third transmitting signal, and the reset module of the n-a-th driving circuit to the reset module of the n-th driving circuit can be connected with TCON or SOC to obtain the third transmitting signal.

In the application, the reset module of the i+2a-th driving circuit can be connected with the second outputting unit of the i+3a-th driving circuit, and the second outputting unit of any driving circuit after the second outputting unit of the i+3a-th driving circuit, and the connection relationship can be determined according to the speed of the reset. In an embodiment, the reset module of the 1+2a-th driving circuit can be connected to the second outputting unit of the i+3a-th driving circuit, then the phase difference between the third transmitting signal and the control signal is π/2, or the reset module of the 1+2a-th driving circuit can be connected to the second outputting unit of the i+3a+1-th driving circuit, then the phase difference between the third transmitting signal and the control signal is π/2-π/a, or the reset module of the 1+2a-th driving circuit can be connected to the second outputting unit of the i+3a+2-th driving circuit, then the phase difference between the third transmitting signal and the control signal is π/2+2π/a. The embodiment of the present application does not impose any restrictions on the driving circuit to which the reset module of the i+2a-th driving circuit is specifically connected.

Figure 18:
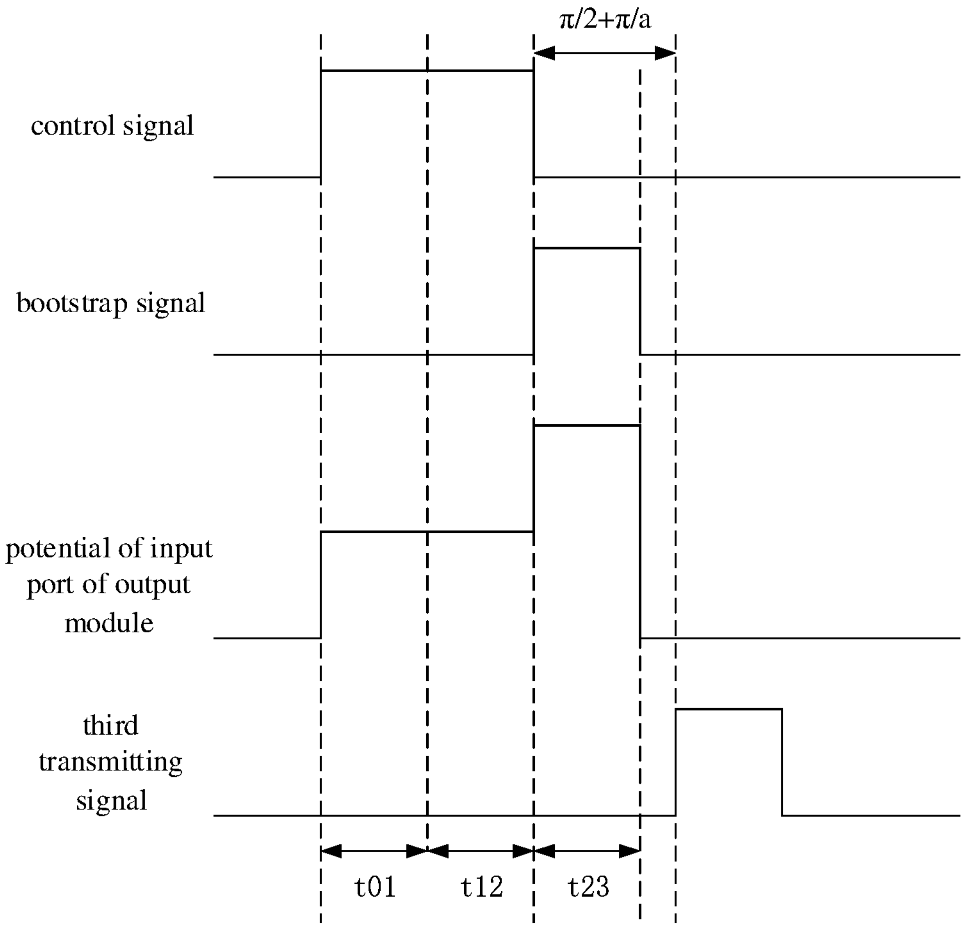
FIG. 18 is a schematic timing sequence diagram of a control signal, a bootstrap signal, a potential of an input port of an output circuit, and a third transmitting signal of a i+2a-th driving circuit when a reset module of a i+2a-th driving circuit is connected to a second outputting unit of a i+3a+1-th driving circuit provided by the embodiment of the present application.

FIG. 18 exemplarily shows a timing sequence diagram of a control signal, a bootstrap signal, a potential of an input port of the output circuit, and a third transmitting signal of the i+2a-th driving circuit when the reset module of the i+2a-th driving circuit is connected to the second outputting unit of the i+3a+1-th driving circuit.

The above are only optional embodiments of the present application, and are not intended to limit the present application. Various modifications and variations of the present application are possible for those skilled in the art. Any modification, equivalent replacement, improvement, etc. made within the spirit and principle of the present application shall be included within the scope of the claims of the present application.

What is claimed is:

1. A driving circuit for a display panel, comprising:

a stretching circuit;

an output circuit;

a bootstrapping circuit, electrically connected with the output circuit; and a control circuit, electrically connected with the stretching circuit, the bootstrapping circuit, and the control circuit, respectively;

wherein the stretching circuit is configured to receive a first level signal, to generate a stretching signal according to the first level signal when a first transmitting signal is received, and to send the stretching signal to the control circuit; wherein the first transmitting signal comprises at least two sub-transmitting signals with different timings, and a time duration of the stretching signal is determined according to a time duration of the first transmitting signal;

the control circuit is configured to receive the first level signal, to generate a control signal according to the first level signal when the stretching signal is received, and to send the control signal to the output circuit and the bootstrapping circuit;

the bootstrapping circuit is configured to receive the control signal and to send a bootstrap signal to the output circuit when the control signal is switched to a low level; and the output circuit is configured to receive a clock signal, to generate a gate driving signal and a second transmitting signal according to the clock signal when the bootstrap signal is received, and to send the gate driving signal to sub-pixels of the display panel and send the second transmitting signal.

2. The driving circuit according to claim 1, wherein the stretching circuit comprises a first stretching unit and a second stretching unit, and the first stretching unit and the second stretching unit are respectively electrically connected to the control circuit, the first transmitting signal comprises a first sub-transmitting signal and a second sub-transmitting signal;

the first stretching unit is configured to receive the first level signal, to generate the first sub-stretching signal according to the first level signal when the first sub-transmitting signal is received, and to send the first sub-stretching signal to the control circuit;

the second stretching unit is configured to receive the first level signal, to generate the second sub-stretching signal according to the first level signal when the second sub-transmitting signal is received, and to send the second sub-stretching signal to the control circuit; and wherein the stretching signal comprises the first sub-stretching signal and the second sub-stretching signal.

3. The driving circuit according to claim 2, wherein the first stretching unit comprises a first electronic switch, the second stretching unit comprises a second electronic switch and a source electrode of the first electronic switch is the same as a source electrode of the second electronic switch, and a drain electrode of the first electronic switch is electrically connected to a drain electrode of the second electronic switch and the control circuit, respectively.

4. The driving circuit according to claim 3, wherein the source electrode of the first electronic switch is configured to receive the first level signal, and, when the gate electrode of the first electronic switch receives the first sub-transmitting signal, the drain electrode of the first electronic switch is configured to generate a first sub-stretching signal according to the first level signal and to send the first sub-stretching signal to the control circuit; and the source electrode of the second electronic switch is configured to receive the first level signal, and, when the gate electrode of the second electronic switch receives the second sub-transmitting signal, the drain electrode of the second electronic switch is configured to generate a second sub-stretching signal according to the first level signal and to send the second sub-stretching signal to the control circuit.

5. The driving circuit according to claim 1, wherein the control circuit comprises a third electronic switch, a gate electrode of the third electronic switch is respectively connected with a drain electrode of the first electronic switch and a drain electrode of the second electronic switch, a drain electrode of the third electronic switch is electrically connected to the bootstrapping circuit and the output circuit, respectively; and a source electrode of the third electronic switch is configured to receive the first level signal, and, when the gate electrode of the third electronic switch receives the stretching signal, the drain electrode of the third electronic switch is configured to generate a control signal according to the first level signal, and to send the control signal to the bootstrapping circuit and the output circuit.

6. The driving circuit according to claim 1, wherein the output circuit comprises a first outputting unit and a second outputting unit, the first outputting unit is electrically connected to the third electronic switch and the bootstrapping circuit, respectively; the second outputting unit is electrically connected to the third electronic switch and the bootstrapping circuit, respectively; and an input port of the first outputting unit is connected to an input port of the second outputting unit to form an input port of the output circuit; and the first outputting unit is configured to receive the clock signal, to generate a gate driving signal according to the clock signal when the bootstrap signal is received, and to send the gate driving signal to the sub-pixels of the display panel;

the second outputting unit is configured to receive the clock signal, to generate a second transmitting signal according to the clock signal when the bootstrap signal is received, and to send he second transmitting signal; and the second outputting unit is further configured to receive the first sub-transmitting signal and to discharge the clock signal when the control signal and the clock signal are received.

7. The driving circuit according to claim 6, wherein the first outputting unit comprises a fourth electronic switch, and the second outputting unit comprises a fifth electronic switch and a sixth electronic switch;

a gate electrode of the fourth electronic switch is connected to a drain electrode of the third electronic switch, a drain electrode of the fourth electronic switch is connected to the sub-pixels of the display panel, the gate electrode of the fourth electronic switch, the drain electrode of the fourth electronic switch, and a gate electrode of the fifth electronic switch are respectively electrically connected to the bootstrapping circuit, and the gate electrode of the fourth electronic switch constitutes the input port of the first outputting unit; and a gate electrode of the fifth electronic switch is connected to the drain electrode of the third electronic switch, a drain electrode of the fifth electronic switch is connected to a source electrode of the sixth electronic switch, and the gate electrode of the fifth electronic switch constitutes the input port of the second outputting unit.

8. The driving circuit according to claim 7, wherein a source electrode of the fourth electronic switch is configured to receive the clock signal, and, when the gate electrode of the fourth electronic switch receives the bootstrap signal, the drain electrode of the fourth electronic switch is configured to generate a gate driving signal according to the clock signal, and to send the gate driving signal to the display panel.

9. The driving circuit according to claim 7, wherein a source electrode of the fifth electronic switch is configured to receive the clock signal, and, when the gate electrode of the fifth electronic switch receives the bootstrap signal, the drain electrode of the fifth electronic switch is configured to generate the second transmitting signal according to the clock signal, and to send the second transmitting signal; and a gate electrode of the sixth electronic switch is configured to receive the first sub-transmitting signal, and, when gate electrode of the fifth electronic switch receives the control signal and the source electrode of the fifth electronic switch receives the clock signal, the a drain electrode of the sixth electronic switch is configured to discharge the clock signal according to the first sub-transmitting signal.

10. The driving circuit according to claim 1, wherein the bootstrapping circuit comprises a first capacitor, and a first terminal of the first capacitor is respectively connected with a drain electrode of a third electronic switch and a gate electrode of a fourth electronic switch, and a gate electrode of a fifth electronic switch, and a second terminal of the first capacitor is respectively connected with a drain electrode of the fourth electronic switch and the display panel.

11. The driving circuit according to claim 10, wherein the first terminal of the first capacitor is configured to receive the control signal, and the first capacitor is charged when the control signal is at a high level; and the first terminal of the first capacitor is further configured to send the bootstrap signal to a gate electrode of the fourth electronic switch and a gate electrode of the fifth electronic switch when the control signal is switched to a low level.

12. The driving circuit according to claim 1, further comprising a reset module, and the reset module is respectively electrically connected with the control circuit, the bootstrapping circuit, and the output circuit; and the reset module is configured to receive the control signal, and to send the control signal to the ground terminal when a third transmitting signal is received.

13. The driving circuit according to claim 12, wherein the reset module comprises a seventh electronic switch, a source electrode of the seventh electronic switch is respectively connected with a drain electrode of a third electronic switch and a gate electrode of a fourth electronic switch, and a gate electrode of a fifth electronic switch is connected to the first terminal of the first capacitor; and a source electrode of the seventh electronic switch is configured to receive the control signal, and when a gate electrode of the seventh electronic switch receives the third transmitting signal, a drain electrode of the seventh electronic switch is configured to send the control signal to the ground terminal.

14. A driving device for a display panel, comprising: 2a clock signal generators and n driving circuits, and each of the driving circuits comprises;

a stretching circuit;

an output circuit;

a bootstrapping circuit electrically connected with the output circuit; and a control circuit electrically connected with the stretching circuit, the bootstrapping circuit, and the control circuit, respectively;

wherein the stretching circuit is configured to receive a first level signal, to generate a stretching signal according to the first level signal when a first transmitting signal is received, and to send the stretching signal to the control circuit; wherein the first transmitting signal comprises at least two sub-transmitting signals with different timings, and a time duration of the stretching signal is determined according to a time duration of the first transmitting signal;

the control circuit is configured to receive the first level signal, to generate a control signal according to the first level signal when the stretching signal is received, and to send the control signal to the output circuit and the bootstrapping circuit;

the bootstrapping circuit is configured to receive the control signal and to send a bootstrap signal to the output circuit when the control signal is switched to a low level;

the output circuit is configured to receive a clock signal, and to generate a gate driving signal and a second transmitting signal according to the clock signal when the bootstrap signal is received, and to send the gate driving signal to sub-pixels of a display panel and send the second transmitting signal;

wherein a j-th clock signal generator is connected to an output circuit of a j+2ka-th driving circuit, a first stretching unit of a i+2a-th driving circuit is connected to a second outputting unit of the i-th driving circuit, and a second outputting unit of the i+2a-th driving circuit is connected to a second outputting unit of a i-th driving circuit, and a second stretching unit of a i+2a-th driving circuit is connected to a second outputting unit of a i+a-th driving circuit;

the j-th clock signal generator is configured to generate a clock signal and send the clock signal to the output circuit of the j+2ka-th driving circuit, and a phase difference between a clock signal generated by the j-th clock signal generator and a clock signal generated by the j+1-th clock signal generator is $\pi/2a$;

the first stretching unit of the i+2a-th driving circuit is configured to send a first sub-stretching signal to the control circuit when the first sub-transmitting signal sent by the second outputting unit of the i-th driving circuit is received;

the second stretching unit of the i+2a-th driving circuit is configured to send a second sub-stretching signal to the control circuit when the second sub-transmitting signal sent by the second outputting unit of the i+a-th driving circuit is received; and the second outputting unit of the i+2a-th driving circuit is configured to receive the first sub-transmitting signal sent by the second outputting unit of the i-th driving circuit, and to discharge the clock signal when the second outputting unit of the i+2a-th driving circuit receives the control signal and the clock signal;

wherein a is an integer greater than or equal to 1; n is an integer greater than 2a; i is greater than or equal to 1 and less than or equal to n−2a; j=1,2, . . . ,2a; k=0,1, 2, . . . ,(n/2a); and j+2ka is less than or equal to n.

15. The driving device according to claim 14, wherein the reset module of the i+2a-th driving circuit is connected to the second outputting unit of a i+3a+1-th driving circuit; and the reset module of the i+2a-th driving circuit is configured to send the control signal to the ground terminal when a third transmitting signal sent by the second outputting unit of the i+3a+1-th driving circuit is received.

* * * * *